(12) United States Patent
Sharma et al.

(10) Patent No.: US 8,706,544 B1
(45) Date of Patent: Apr. 22, 2014

(54) METHOD AND SYSTEM FOR AUTOMATICALLY MEASURING AND FORECASTING THE DEMOGRAPHIC CHARACTERIZATION OF CUSTOMERS TO HELP CUSTOMIZE PROGRAMMING CONTENTS IN A MEDIA NETWORK

(75) Inventors: Rajeev Sharma, State College, PA (US); Satish Mummareddy, State College, PA (US); Jeff Hershey, Norfolk, VA (US); Hankyu Moon, State College, PA (US)

(73) Assignee: VideoMining Corporation, State College, PA (US)

( * ) Notice: Subject to any disclaimer, the term of this patent is extended or adjusted under 35 U.S.C. 154(b) by 1828 days.

(21) Appl. No.: 11/805,321

(22) Filed: May 23, 2007

Related U.S. Application Data

(60) Provisional application No. 60/808,283, filed on May 25, 2006.

(51) Int. Cl.
*G06Q 10/00* (2012.01)

(52) U.S. Cl.
USPC .......................................................... 705/7.31

(58) Field of Classification Search
USPC .......................................................... 705/7.31
See application file for complete search history.

(56) References Cited

U.S. PATENT DOCUMENTS

| | | | |
|---|---|---|---|
| 5,047,614 A | 9/1991 | Bianco | |
| 5,155,591 A | 10/1992 | Wachob | |
| 5,283,731 A | 2/1994 | Lalonde et al. | |
| 5,309,355 A | 5/1994 | Lockwood | |
| 5,331,544 A | 7/1994 | Lu et al. | |
| 5,459,306 A | 10/1995 | Stein et al. | |
| 5,636,346 A | 6/1997 | Saxe | |
| 6,002,393 A | 12/1999 | Hite et al. | |
| 6,055,573 A | 4/2000 | Gardenswartz et al. | |
| 6,119,098 A | 9/2000 | Guyot et al. | |
| 6,182,050 B1 | 1/2001 | Ballard | |
| 6,236,975 B1 | 5/2001 | Boe et al. | |
| 6,298,330 B1 | 10/2001 | Gardenswartz et al. | |
| 6,385,592 B1 | 5/2002 | Angles et al. | |
| 6,408,278 B1 | 6/2002 | Carney et al. | |
| 6,484,148 B1 | 11/2002 | Boyd | |

(Continued)

OTHER PUBLICATIONS

Advancedinterfaces.com Web Pages Advanced Interfaces, Inc., Dec. 2003-Apr. 2004.*

(Continued)

*Primary Examiner* — Johnna Loftis

(57) ABSTRACT

The present invention is a method and system for forecasting the demographic characterization of customers to help customize programming contents on each means for playing output of each site of a plurality of sites in a media network through automatically measuring, characterizing, and estimating the demographic information of customers that appear in the vicinity of each means for playing output. The analysis of demographic information of customers is performed automatically based on the visual information of the customers, using a plurality of means for capturing images and a plurality of computer vision technologies on the visual information. The measurement of the demographic information is performed in each measured node, where the node is defined as means for playing output. Extrapolation of the measurement characterizes the demographic information per each node of a plurality of nodes in a site of a plurality of sites of a media network. The forecasting and customization of the programming contents is based on the characterization of the demographic information.

28 Claims, 26 Drawing Sheets

(56) References Cited

U.S. PATENT DOCUMENTS

| | | | |
|---|---|---|---|
| 6,529,940 | B1 | 3/2003 | Humble |
| 6,847,969 | B1 | 1/2005 | Mathai et al. |
| 6,925,441 | B1 | 8/2005 | Jones, III et al. |
| 6,990,217 | B1 * | 1/2006 | Moghaddam et al. ........ 382/118 |
| 7,003,476 | B1 | 2/2006 | Samra et al. |
| 2002/0184098 | A1 * | 12/2002 | Giraud et al. .................. 705/14 |
| 2003/0066078 | A1 * | 4/2003 | Bjorgan et al. ................ 725/34 |
| 2003/0110038 | A1 | 6/2003 | Sharma et al. |
| 2003/0216958 | A1 | 11/2003 | Register et al. |
| 2004/0128198 | A1 | 7/2004 | Register et al. |
| 2006/0036485 | A1 | 2/2006 | Duri et al. |

OTHER PUBLICATIONS

VideoMining.com Web Pages Advanced Interfaces, Inc., Jun. 2004-Feb. 2005.*

Anuj Mohan, et al., "Example-Based Object Detectoin in Images by Components," 2001 IEEE Transactions on Pattern Analysis and Machine Intelligence, vol. 23, No. 4, pp. 349-361.

I. Haritaoglu and M. Flickner, "Attentive Billboards," 11th International Conference on Image Analysis and Processing, Sep. 26-28, 2001, Palermo, Italy.

I. Haritaoglu and M. Flickner, "Detection and tracking of shopping groups in stores," IEEE International Conference on Computer Vision and Pattern Recognition, 2001.

E. Osuna, R. Freund and F. Girosi, "Training Support Vector Machines: An Application to Face Detection," Proc. IEEE Conf. Computer Vision and Pattern Recognition, 1997, pp. 130-136.

H. Rowley, S. Baluja and T. Kanade, "Neural Network-Based Face Detection," IEEE Trans. Pattern Analysis and Machine Intelligence, vol. 20, No. 1, Jan. 1998, pp. 23-38.

M. H. Yang, D. J. Kriegman and N. Ahuja, "Detecting Faces in Images: A Survey," IEEE Trans. Pattern Analysis and Machine Intelligence, Jan. 2002, vol. 24, No. 1.

B. Moghaddam and M. Yang, "Gender Classification with Support Vector Machines," in Proceedings of the Fourth IEEE International Conference on Automatic Face and Gesture Recognition 2000. Mar. 26-30, 2000. FG. IEEE Computer Society. Washington, DC. 306.

Michael J. Lyons, et al., "Automatic Classification of Single Facial Images," IEEE Transactions on Pattern Analysis and Machine Intelligence, 1999, vol. 21, No. 12, pp. 1357-1362.

Gregory Shaknarovich, et al., A Unified Learning Framework for Real Time Face Detection and Classification, in Proceedings of Fifth IEEE International Conference on Automatic Face and Gesture Recognition, May 20-21, 2002.

Srinivas Gutta, et al., "Gender and Ethnic Classification of Face Images," in Proceedings of IEEE International Conference on Automatic Face and Gesture Recognition, 1998, pp. 194-199.

Young Ho Kwon and Niels Da Vitoria Lobo, "Age Classification from Facial Images," Computer Vision and Pattern Recognition, Proceedings CVPR 1994, IEEE Computer Society Conference on, 1994, pp. 762-767.

* cited by examiner

| CATEGORY OF CLUSTERED SITES | NODE TYPE |
|---|---|
| CLUSTER CATEGORY 1 | NT1  NT2  NT3  NT4 |
| CLUSTER CATEGORY 2 | NT5  NT6  NT7 |
| CLUSTER CATEGORY 3 | NT8  NT9  NT10 |
| ⋮ | ⋮ |

162

| NODE TYPE | NODE CLUSTER CATEGORY, SITE, AND LOCATION | | |
|---|---|---|---|
| NT1 | [CAT1, SITE1, LOC1] | [CAT1, SITE2, LOC1] | |
| NT2 | [CAT1, SITE1, LOC2] | [CAT1, SITE2, LOC2] | [CAT1, SITE3, LOC2] |
| NT3 | [CAT1, SITE1, LOC3] | [CAT1, SITE3, LOC3] | |
| NT4 | [CAT1, SITE1, LOC4] | [CAT1, SITE2, LOC4] | [CAT1, SITE3, LOC4] |
| NT5 | [CAT2, SITE4, LOC5] | [CAT2, SITE5, LOC5] | |
| NT6 | [CAT2, SITE4, LOC6] | [CAT2, SITE5, LOC6] | |
| NT7 | [CAT2, SITE4, LOC7] | [CAT2, SITE5, LOC7] | |
| NT8 | [CAT3, SITE6, LOC8] | [CAT3, SITE7, LOC8] | |
| NT9 | [CAT3, SITE6, LOC9] | [CAT3, SITE7, LOC9] | |
| NT10 | [CAT3, SITE6, LOC10] | [CAT3, SITE7, LOC10] | |
| ⋮ | ⋮ | | |

| TRENDS | REQUIRED DATA | EXPERT INPUT (IN ABSENCE OF DATA) |
|---|---|---|
| YEARLY GROWTH | >16 MONTHS | GROWTH PREDICTION |
| MONTH OF THE YEAR PATTERNS | >16 MONTHS | RELATIVE TRAFFIC BETWEEN MONTHS |
| WEEK OF THE MONTH PATTERNS | >3 MONTHS | RELATIVE TRAFFIC BETWEEN WEEKS |
| DAY OF THE WEEK PATTERNS | >1 MONTH | RELATIVE TRAFFIC BY DAY OF WEEK |
| HOUR OF THE DAY PATTERNS | >1 WEEK | RELATIVE TRAFFIC BY TIME OF DAY |
| SPECIAL SHOPPING DAYS / WEEKS | >14 MONTHS | RELATIVE TRAFFIC FOR SPECIAL DAYS/WEEKS |
| HOLIDAYS | >12 MONTHS + USER VERIFICATION | HOLIDAY DATES |

| BUSINESS UNFORESEEN FACTORS | REQUIRED DATA | EXPERT INPUT (IN ABSENCE OF DATA) |
|---|---|---|
| PROMOTIONS/ CAMPAIGNS | TRENDS + FEW P/C | RELATIVE CHANGE DUE TO P/C |
| NEW PRODUCT INTRODUCTIONS | TRENDS + FEW NPI | RELATIVE CHANGE DUE TO NPI |
| WEATHER | TRENDS + FEW INCIDENTS | RELATIVE CHANGE DUE TO WEATHER |

Fig. 26

METHOD AND SYSTEM FOR AUTOMATICALLY MEASURING AND FORECASTING THE DEMOGRAPHIC CHARACTERIZATION OF CUSTOMERS TO HELP CUSTOMIZE PROGRAMMING CONTENTS IN A MEDIA NETWORK

CROSS-REFERENCE TO RELATED APPLICATIONS

This application is based on and claims priority to U.S. Provisional Application No. 60/808,283, filed May 25, 2006, which is fully incorporated herein by reference.

FEDERALLY SPONSORED RESEARCH

Not Applicable

SEQUENCE LISTING OR PROGRAM

Not Applicable

BACKGROUND OF THE INVENTION

Field of the Invention

The present invention is a method and system for forecasting the demographic characterization of customers to help customize programming contents on each node, defined as means for playing output, of each site of a plurality of sites in a media network through automatically measuring, characterizing, and estimating the demographic information of customers that appear in the vicinity of each means for playing output, using a plurality of image capturing devices and a plurality of computer vision technologies on the visual information, and the present invention is called demographic-based programming (DBP).

Background of the Invention

There have been earlier attempts to help customers and salespersons in the shopping process utilizing computer-aided devices, such as U.S. Pat. No. 5,047,614 of Bianco, U.S. Pat. No. 5,283,731 of Lalonde, et al. (hereinafter Lalonde), and U.S. Pat. No. 5,309,355 of Lockwood. Bianco disclosed a portable and remote bar code reading means. Lalonde disclosed a computer based classified advertisement system. Lockwood disclosed an automated sales system, which enhances a travel agent's marketing ability, especially with regard to computerized airline reservation systems.

There have also been attempts to customize and distribute targeted advertising content to customers or television viewers based on customer profiles, customer purchase history, or demographic information from the customer in the prior art.

U.S. Pat. No. 5,155,591 of Wachob and U.S. Pat. No. 5,636,346 of Saxe disclosed methods and systems for delivering targeted advertisements and programming to demographically targeted television audiences. U.S. Pat. No. 6,002,393 of Hite, et al. disclosed a system and method for delivering targeted advertisements to customers utilizing controllers.

U.S. Pat. No. 5,459,306 of Stein, et al. (hereinafter Stein) disclosed a method and system for delivering product picks to a prospective individual user, especially within the movie rental and sale business. Stein gathered the user information and the user's use information, which are correlated with a user code and classified based on the use of at least one product. The product picks (promotions and recommendations) are delivered based on the classified information and the user information. However, Stein is clearly foreign to the method of automatically gathering the demographic information using the computer vision technology in a store, although Stein briefly mentioned the demographic information for establishing the user code.

U.S. Pat. No. 6,119,098 of Guyot, et al. (hereinafter Guyot) disclosed a method and apparatus for targeting and distributing advertisements over a distributed network, such as the Internet, to the subscriber's computer. The targeted advertisements were based on a personal profile provided by the subscriber. Guyot was primarily intended for the subscriber with a computer at home, not at a store or in a public retail place, and the targeted advertisement creation relied on the non-automatic response from the customer.

U.S. Pat. No. 6,182,050 of Ballard disclosed a method and apparatus for distributing advertisements online using target criteria screening, which also provided a method for maintaining end user privacy. In the disclosure, the demographic information or a desired affinity ranking was gathered by the end user, who completed a demographic questionnaire and ranked various categories of products and services. Ballard is foreign to the concept of automatically gathering the demographic information from the customers without requiring any cumbersome response from the end user in a retail store.

U.S. Pat. No. 6,055,573 of Gardenswartz, et al. and its continuation U.S. Pat. No. 6,298,330 of Gardenswartz, et al. (hereinafter Gardenswartz) disclosed a method and apparatus for communicating with a computer in a network based on the offline purchase history of a particular customer. Gardenswartz included the delivery of a promotional incentive for a customer to comply with a particular behavioral pattern. In Gardenswartz, the customer has to supply the registration server with information about the customer, including demographics of the customer, to generate an online profile.

U.S. Pat. No. 6,385,592 of Angles, et al. (hereinafter Angles) disclosed a method and apparatus for delivering customized advertisements within interactive communication systems. In Angles, the customer, who wished to receive customized advertisement, first registered with the advertisement provider by entering the demographic information into the advertisement provider's demographic database. Therefore Angles is foreign to the automatic measuring of the customer demographic information, without requiring any cumbersome response from the customer.

U.S. Pat. No. 6,408,278 of Carney, et al. (hereinafter Carney) disclosed a method and apparatus for delivering programming content on a network of electronic out-of-home display devices. In Carney, the network includes a plurality of display devices located in public places, and the delivered programming content is changed according to the demographics of the people. Carney also suggests demographic data-gathering devices, such as a kiosk and automatic teller machine.

U.S. Pat. No. 6,484,148 of Boyd disclosed electronic advertising devices and methods for providing targeted advertisements based on the customer profiles. Boyd included a receiver for receiving identifying signals from individuals, such as signals emitted by cellular telephones, and the identifying signal was used for the targeted advertisements to be delivered to the individuals.

U.S. Pat. No. 6,847,969 of Mathai, et al. (hereinafter Mathai) disclosed a method and system for providing personalized advertisements to customers in public a place. In Mathai, the customer inserts a personal system access card into a slot on a terminal, which automatically updates the customer profile based on the customer's usage history. The customer profile is used for targeted advertising in Mathai. However, the usage of a system access card is cumbersome to the customer. The customer has to carry around the card when shopping, and the method and apparatus is not usable if the card is lost or stolen. U.S. Pat. No. 6,529,940 of Humble also disclosed a method and system for interactive in-store marketing, using interactive display terminals that allow customers to input feedback information to the distributed marketing messages.

U.S. Pat. Appl. Pub. No. 2003/0216958 of Register, et al. and its continuation-in-part U.S. Pat. Appl. Pub. No. 2004/0128198 of Register, et al. (hereinafter Register) disclosed a method and system for network-based in-store media broadcasting. Register disclosed each of the client player devices is independently supported by the communication with the internal audio/visual system installed in the business location, and he also disclosed a customizable broadcast is supported on each of the client player devices, specific to the particular business location. However, Register is foreign to the concept of automatically measuring the demographic information of the customers in the particular business location using the computer vision technology as the customization method of the contents for each client player device. Therefore, Register did not disclose any details of how to measure the demographic information in an unobtrusive way, how to extrapolate the measured demographic information samples, and how to characterize the demographic information to customize the programming contents for each client player device in the media broadcasting system.

U.S. Pat. Appl. Pub. No. 2006/0036485 of Duri, et al. (hereinafter Duni) disclosed a method and system for presenting personalized information to consumers in a retail environment using the RFID technology. Dun very briefly mentioned the computer vision techniques as a method to locate each customer, but Duri is clearly foreign to the concept of utilizing an image classifier in the computer vision technologies to gather demographic information of the customers to customize the programming contents in a media network.

I. Haritaoglu, and M. Flickner, in "Attentive Billboards", 11th International Conference on Image Analysis and Processing, Sep. 26-28, 2001, Palermo, Italy, disclosed a real-time vision system, which detected, tracked, and counted the number of people standing in front of billboards.

On the other part of the effort in a retail shopping environment, there have been attempts for collecting market research data in a retail store.

U.S. Pat. No. 5,331,544 of Lu, et al. (hereinafter Lu) disclosed an automated system for collecting market research data. Lu disclosed an automatic face recognition system that can measure the shopping frequency at a given store. Lu also disclosed shopper's attentiveness to a display may be correlated with purchases of products and with other demographic purchase-related variables.

U.S. Pat. No. 6,236,975 of Boe, et al. (hereinafter Boe) disclosed a method and system for compiling customer data using an online interaction between a customer and a survey system. Boe's system is intended for targeted marketing, but it is not an automatic system for delivering targeted advertisement content to a display in a retail store.

U.S. Pat. No. 6,925,441 of Jones, III, et al. (hereinafter Jones) disclosed a system and method for targeted marketing, in which the targeted marketing is based on the financial characteristics of the customer, the type of offer being made, and the channel of communication for delivery of the offer. One of the objects in Jones is to have a better description of a customer's spending habits through querying databases.

U.S. Pat. No. 7,003,476 of Samra, et al. (hereinafter Samra) also disclosed a system and method for targeted marketing using a 'targeting engine', which analyses data input and generates data output. Samra used historical data to determine a target group based on a plurality of embedded models, where the models are defined as predicted customer profiles based on historic data, and the models are embedded in the 'targeting engine'. In Samra, the 'targeting engine' maintains a customer database based on demographics, but Samra includes income, profession, marital status, or how long at a specific address as the demographic information, which cannot be automatically gathered by any computer vision algorithms over the visual information of the customers. Therefore, Samra is clearly foreign to the idea of measuring the demographic information automatically using computer vision technologies for changing the programming contents in a media network.

While the above mentioned prior arts try to deliver targeted contents to the customers in a computer network or a standalone system, using customer profiles, customer's purchase history, various devices and tools, or non-automatic demographic information collection methods from customers, they are foreign to the concept of customizing the programming contents in a media network based on the characterization of customers' demographic information, such as gender, age, and ethnicity ratio, in a public space without requiring any cumbersome involvement from the customer. In the prior arts, the attempts to customize advertising content using demographic information or customer profile rely on cumbersome requested feedback from the customers or manual input, such as using questionnaires, registration forms, or electronic devices. Automatic characterization of customer demographic information in the public space based on the actual measurement by the computer vision technology is foreign to any of the prior art.

The present invention is a method and system for forecasting the demographic characterization of customers to help customize programming contents on each node, defined as means for playing output, of each site of a plurality of sites in a media network through automatically measuring, characterizing, and estimating the demographic information of customers that appear in the vicinity of each means for playing output, and the present invention is called demographic-based programming (DBP). It is an objective of the present invention to provide an efficient and robust solution that solves the aforementioned problems in the prior art.

Computer vision algorithms have been shown to be an effective means for detecting and tracking people. These algorithms also have been shown to be effective in analyzing the demographic information of people in the view of the means for capturing images. This allows for the possibility of connecting the visual information from a scene to the content of programming in a media network. The invention automatically and unobtrusively analyzes the customers' demographic information without involving any hassle of feeding the information manually by the customers or operator.

There have been prior attempts for recognizing the demographic category of a person by processing the facial image using a machine learning approach.

U.S. Pat. No. 6,990,217 of Moghaddam, et al. (hereinafter Moghaddam) disclosed a method to employ Support Vector Machine to classify images of faces according to gender, by training the images including images of male and female faces; determining a plurality of support vectors from the training images for identifying a hyperplane for the gender decision; and reducing the resolution of the training images and the test image by sub-sampling before supplying the images to the Support Vector Machine.

U.S. Pat. Appl. Pub. No. 20030110038 of Sharma et al. (hereinafter Sharma) disclosed a computer software system for multi-modal human gender classification, comprising: a first-mode classifier classifying first-mode data pertaining to male and female subjects according to gender and rendering a first-mode gender-decision for each male and female subject; a second-mode classifier classifying second-mode data pertaining to male and female subjects according to gender and rendering a second-mode gender-decision for each male and female subject; and a fusion classifier integrating the individual gender decisions obtained from said first-mode classifier and said second-mode classifier and outputting a joint gender decision for each of said male and female subjects.

Moghaddam and Sharma for demographics classification mentioned above aim to classify a certain class of demographics profile, such as only for gender, based on the image signature of faces. These approaches deal with a much smaller scope of problems than the claimed method in the proposed invention tries to solve; they both assume that the facial regions are identified and only address the problem of individual face classification. They do not address the problem of detecting and tracking the faces for determining the demographic identity of a person over the course of his/her facial exposure to the imaging device.

The proposed invention is a much more comprehensive solution where the automated system captures video frames, detects customer faces in the frames, tracks the faces individually, corrects the pose of the faces, and finally classifies the demographics profiles of the customers—both of the gender and the ethnicity. The face tracking algorithm has been designed and tuned to improve the classification accuracy; the facial geometry correction step improves both the tracking and the individual face classification accuracy, and the improved tracking further improves the accuracy of the classification of gender and ethnicity over the course of visibly tracked faces by combining the individual face classification scores.

Another limitation found in the prior arts is that the data-gathering device is often required to be located adjacent to the output devices, such as the display device or audio device. However, the DBP enables the separation of the device installation locations between the data-gathering devices, set of cameras, and the output devices, as long as the customers are within the view of the data-gathering devices. This feature in DBP makes the layout of equipment installation flexible. Thus, the DBP enables the targeted programming content to be delivered through the output devices, which do not need to be located adjacent to the data-gathering devices, such as cameras. The owners of particular public places or retail places could utilize widely used and already installed surveillance cameras in their places for the data gathering, although the surveillance cameras are not necessarily located adjacent to the output devices.

SUMMARY

The present invention is a method and system for forecasting the demographic characterization of customers to help customize programming contents on each means for playing output of each site of a plurality of sites in a media network through automatically measuring, characterizing, and estimating the demographic information of customers that appear in the vicinity of each means for playing output, using a plurality of image capturing devices and a plurality of computer vision technologies on the visual information.

The present invention, DBP, provides tailored audience measurement steps for media networks in public spaces. The steps provide an understanding of audience composition and aid in the matching of content to specific targeted groups. The DBP leverages a proprietary automated demographic classification as well as its sampling, characterization and forecasting methods.

The exemplary embodiment of the DBP works in concert with network owners and operators to gain a full understanding of each network to be characterized. Next, the exemplary embodiment selects a representative sample of nodes that reflects the breadth and variety of the nodes in the network. This selection process considers variables such as screen classes, geographic markets, site types, screen placements, etc. In another exemplary embodiment, it is possible that the invention can measure the demographics from all of the nodes rather than only sample nodes. Whether the measurement is performed at the sample nodes or entire nodes can be influenced by a plurality of variables, such as the complexity of the targeted measurement data, the goal of the market, and the size of media network.

Measurement of the audience for the group of sample screens is carried out using an automated, computer vision-based media measurement and demographic segmentation system. These systems are installed in the vicinity of each node in the measured nodes, and statistics about each node's addressable audience and that audience's demographic characteristics are collected. In the DBP, the attachment of these systems to each node is logically defined. Therefore, the DBP allows a certain degree of flexibility in the installation locations between these systems and the node.

Using statistical methods, the embodiment can provide network-wide and node-level characterizations for each node in the network based on the measurements obtained at the nodes. Characterizations are provided for a given window of time, and detail a node's audience demographics for that time increment. These characterizations provide the basis for validating current media content, its relevance to the current audience, and forecasting of the audience composition for more targeted future media purchases and placements.

Based on the screen-level characterization of the network, derived from actual measurements of audience demographics over a given period, the invention forecasts the screen and network characterization. The forecasting can also be modified based on past characterization data, seasonal and other trends in an embodiment.

It is an object of the present invention to analyze the customers' demographic information automatically without requiring any cumbersome involvement or feedback from the customers.

It is a further object of the present invention to eliminate the need for the use of any physical devices or media, such as cellular telephones, personal digital assistants (PDAs), ATM machines, Kiosks, terminal keypads, online feedback, survey forms, registration forms, questionnaires, bar-coded cards, identification cards, or access cards, for analyzing the customers' demographic information in the public space of a media network.

It is another object of the present invention to use the visual information of the customers to automatically analyze the demographic information of the customers, with a plurality of image capturing devices and a plurality of computer vision technologies.

It is a further object of the present invention to generate the characterization of the demographics in the customer profiles, which are used for forecasting and customizing the programming contents in a media network, based purely on the automatic analysis of the customers' demographic information in a public space in a media network.

In a preferred embodiment, the installation location of the means for capturing images is not limited by the installation location of the means for playing output for the customized programming contents.

DRAWINGS

Figures

Figure 6:
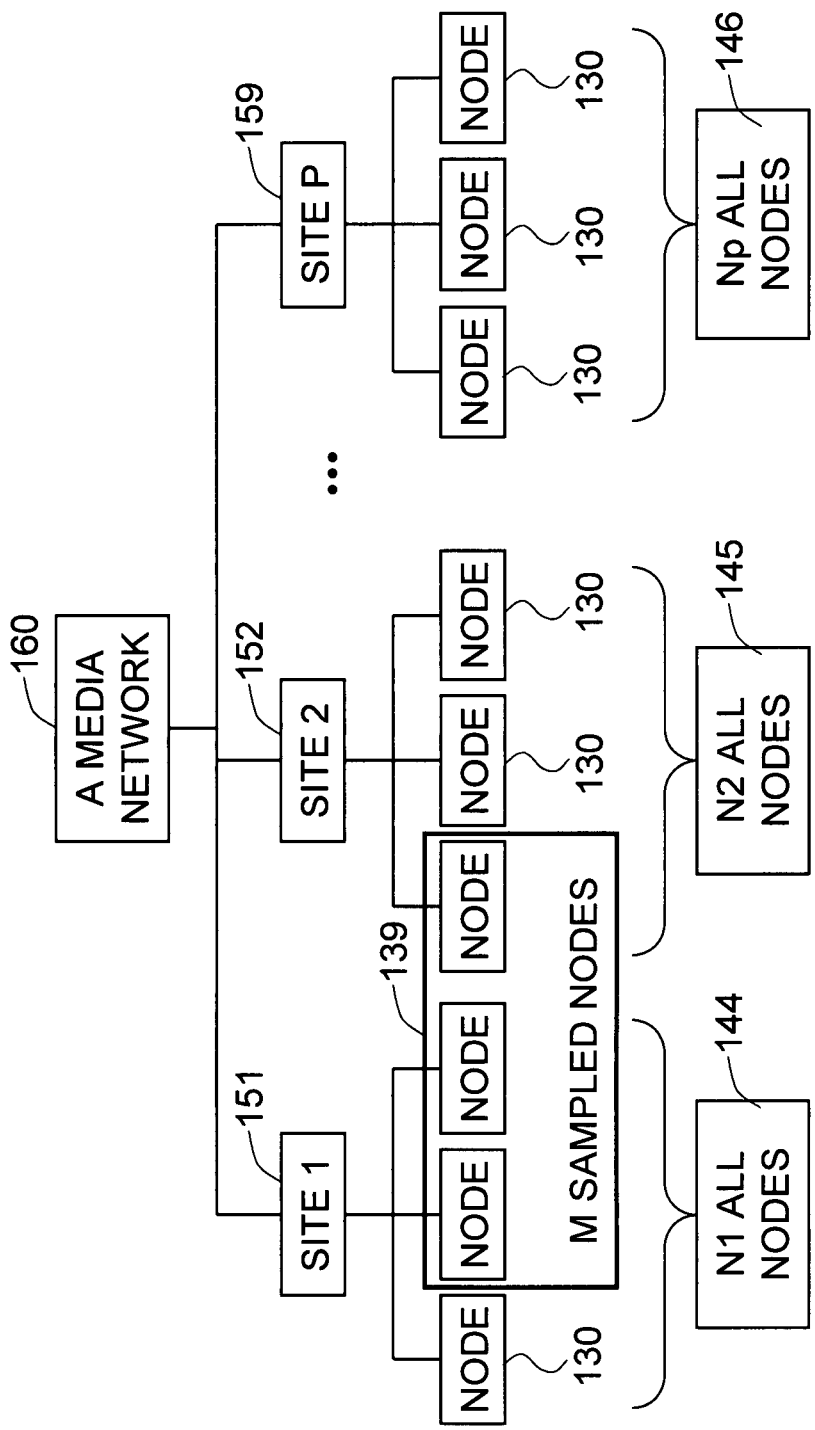

FIG. 6 further shows the hierarchy of another exemplary media network with an exemplary embodiment of the invention, where the media network consists of a plurality of sites, and some of the nodes across the media network are sampled for the demographics measurement.

Figure 7:
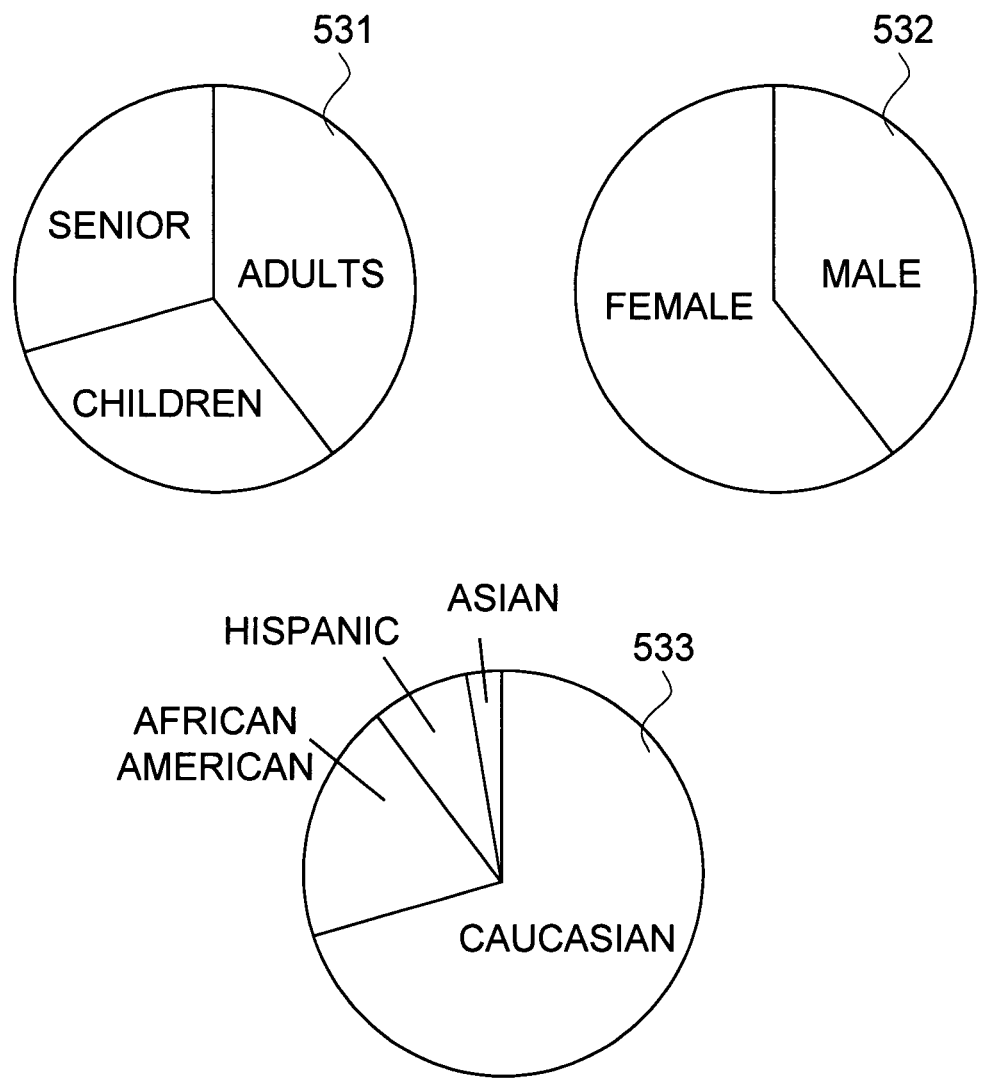

FIG. 7 shows exemplary pie charts of the exemplary demographic information measurement from a means for capturing images, where the pie charts provide useful characterization and forecasting information to the decision maker in a site or a media network.

Figure 8:
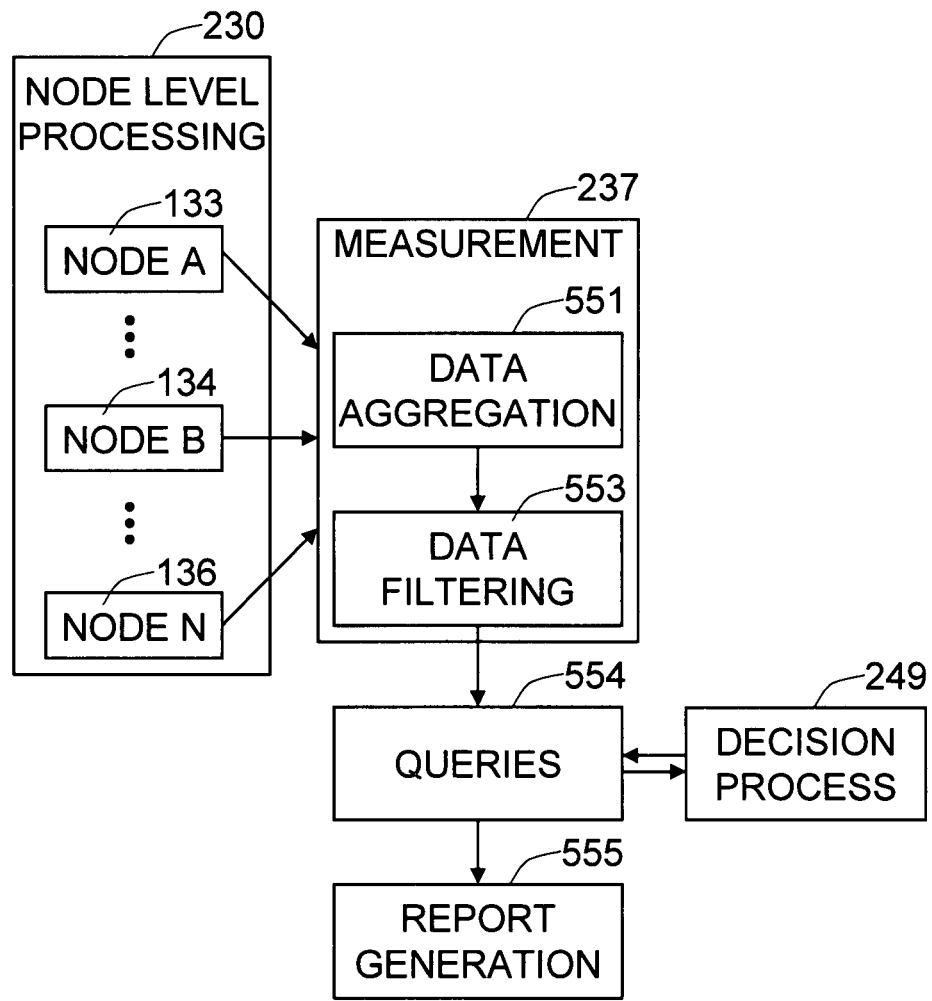

FIG. 8 shows an exemplary embodiment of the demographic information measurement and an exemplary method for generating a useful marketing report to the decision maker in a site or a media network through queries.

Figure 9:
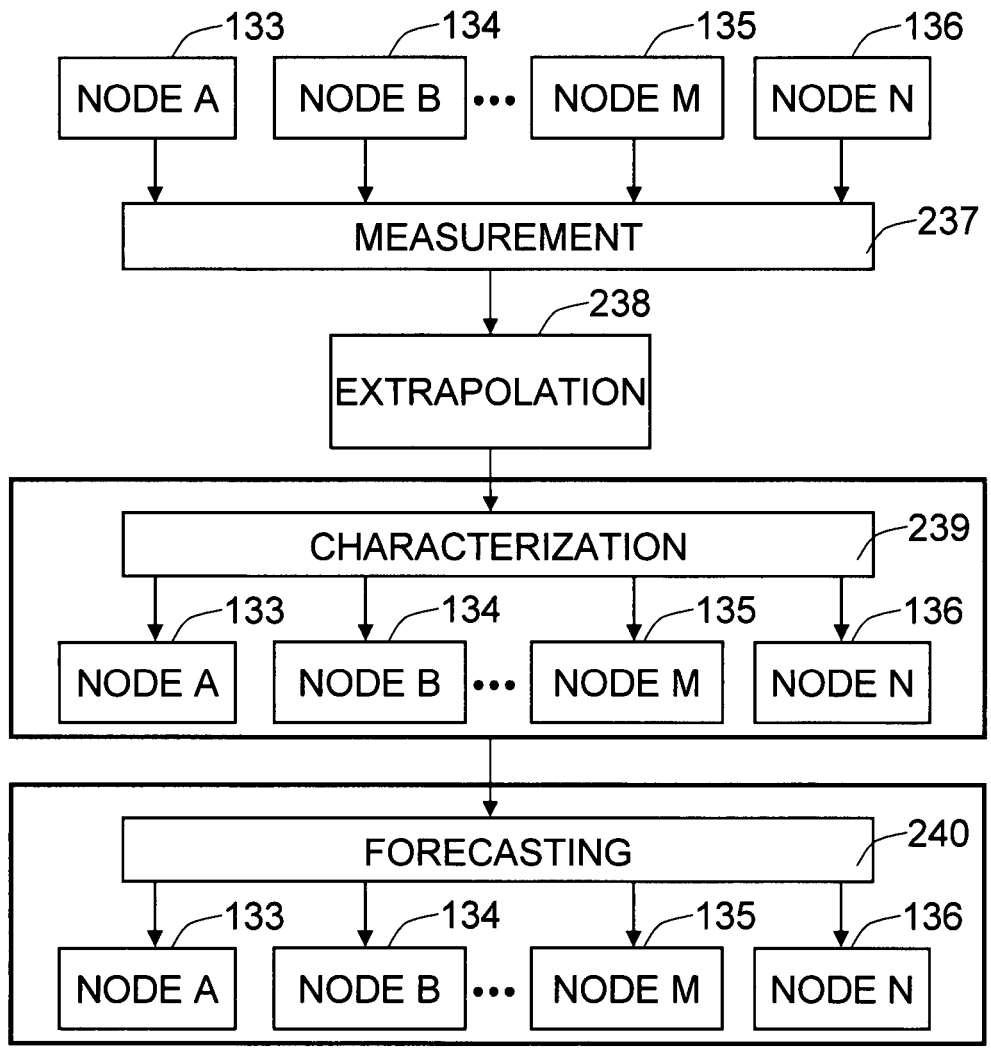

FIG. 9 shows exemplary steps in an exemplary embodiment of the invention, where the steps consist of the automatic demographics measurement from all the nodes in each site of a media network, the extrapolation of the measurement, the characterization of the demographic information for each node, and the forecasting of the demographic characterization to help customize programming contents for each node.

Figure 10:
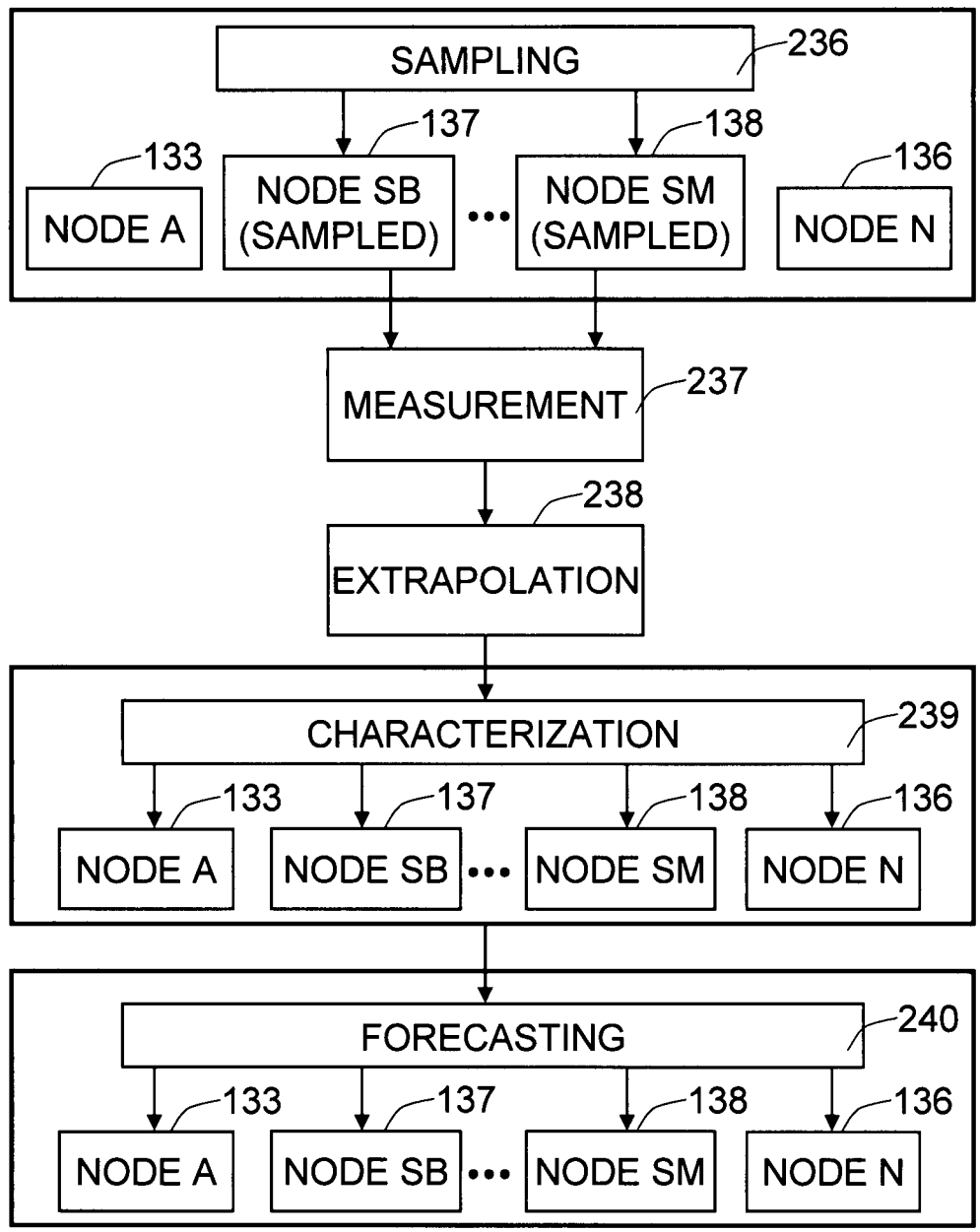

FIG. 10 shows exemplary steps in another exemplary embodiment of the invention, where the steps consist of the automatic demographics measurement from the sampled nodes in a media network, the extrapolation of the measurement, the characterization of the demographic information for each node, and the forecasting of the demographic characterization to help customize programming contents for each node.

Figure 11:
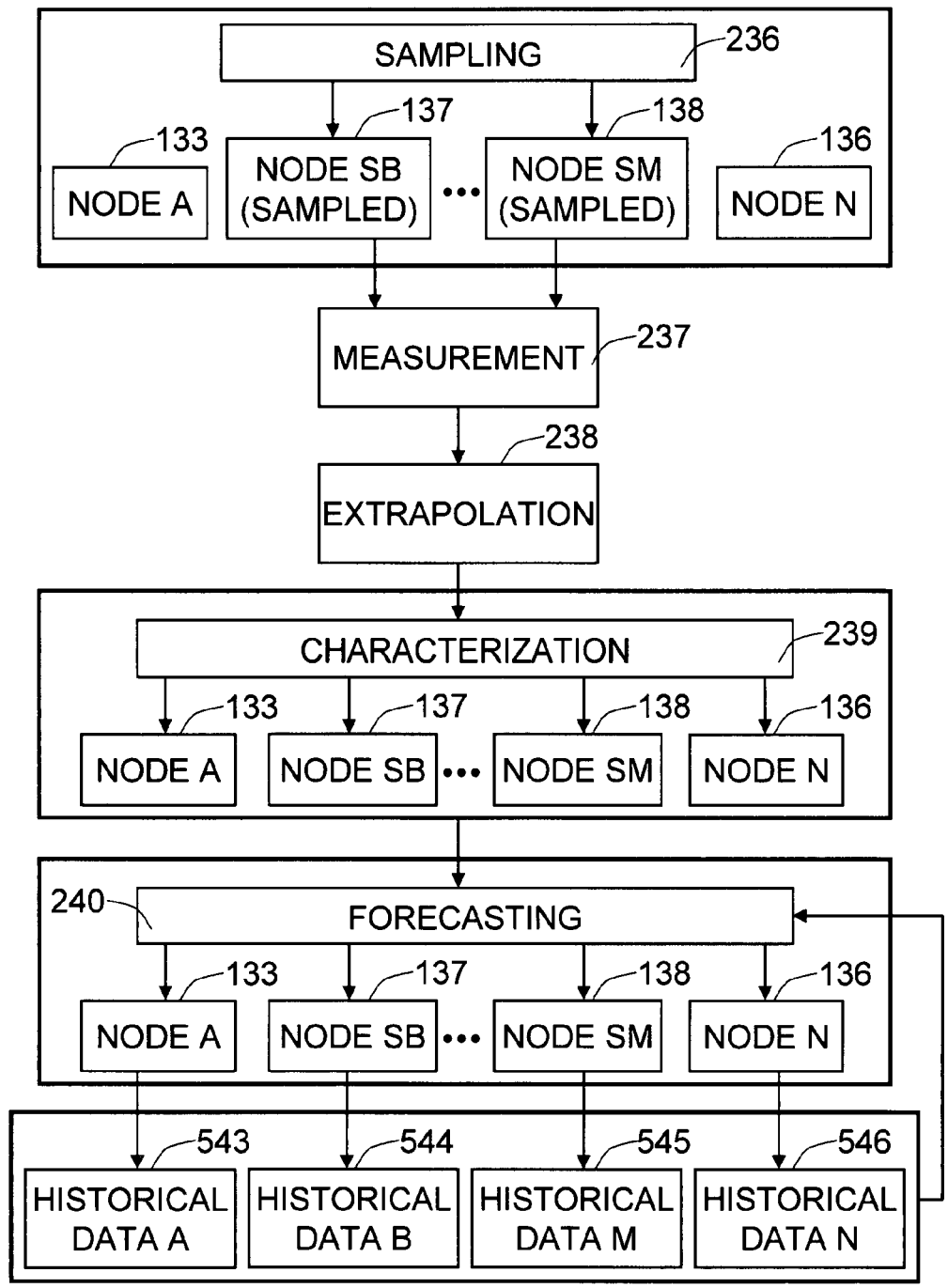

FIG. 11 shows exemplary steps in another exemplary embodiment of the invention, where the steps consist of the automatic demographics measurement from the sampled nodes in a media network, the extrapolation of the measurement, the characterization of the demographic information for each node, the forecasting of the demographic characterization to help customize programming contents for each node, the record keeping of the forecasting information in each node, and the utilization of the historical forecasting information record to modify the current forecasting step.

Figure 12:
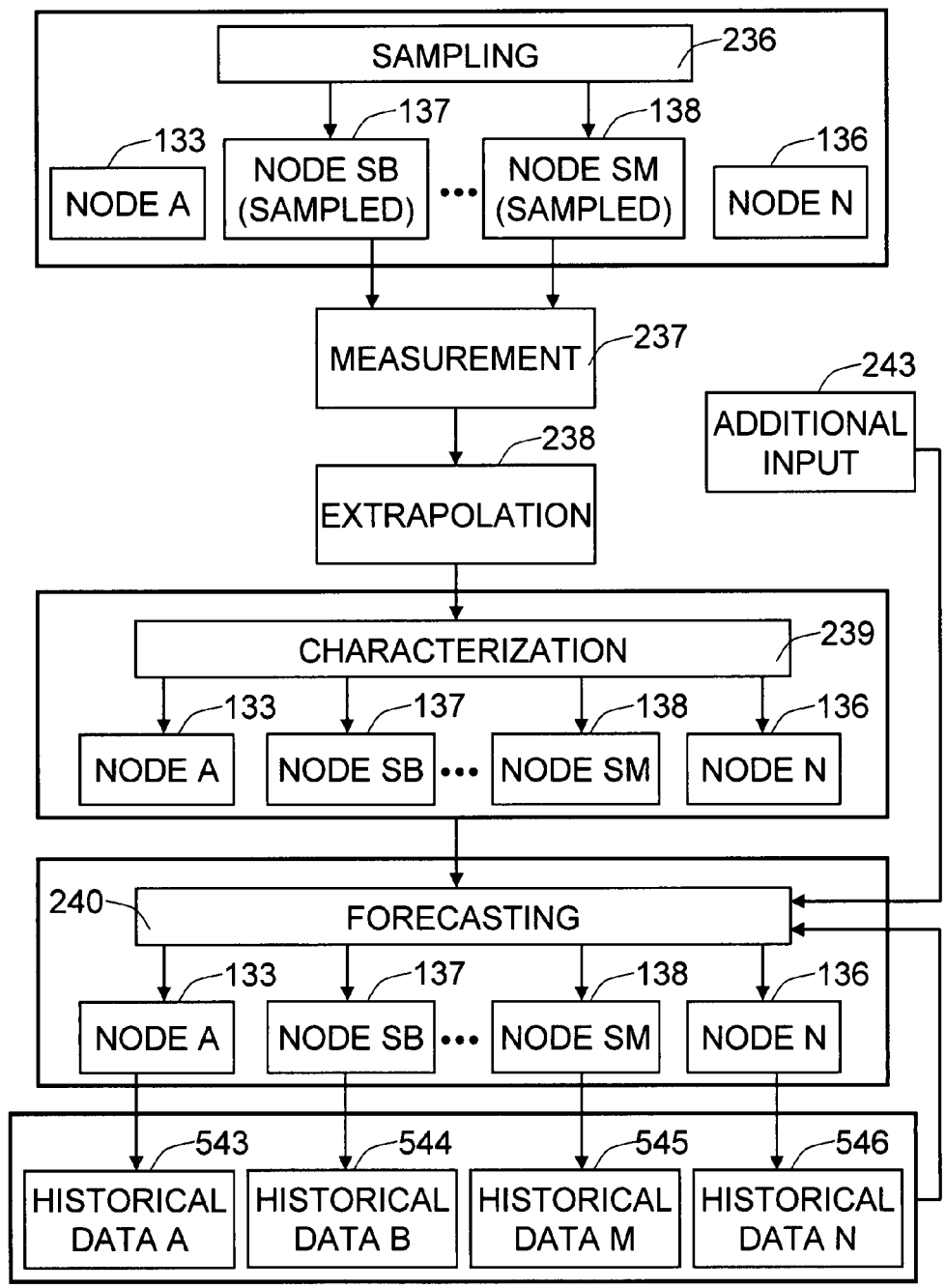

FIG. 12 shows exemplary steps in another exemplary embodiment of the invention, where the steps consist of the automatic demographics measurement from the sampled nodes in a media network, the extrapolation of the measurement, the characterization of the demographic information for each node, the forecasting of the demographic characterization to help customize programming contents for each node, the record keeping of the forecasting information in each node, the utilization of the historical forecasting information record to modify the current forecasting step, and the utilization of additional input to modify the current forecasting step.

Figure 13:
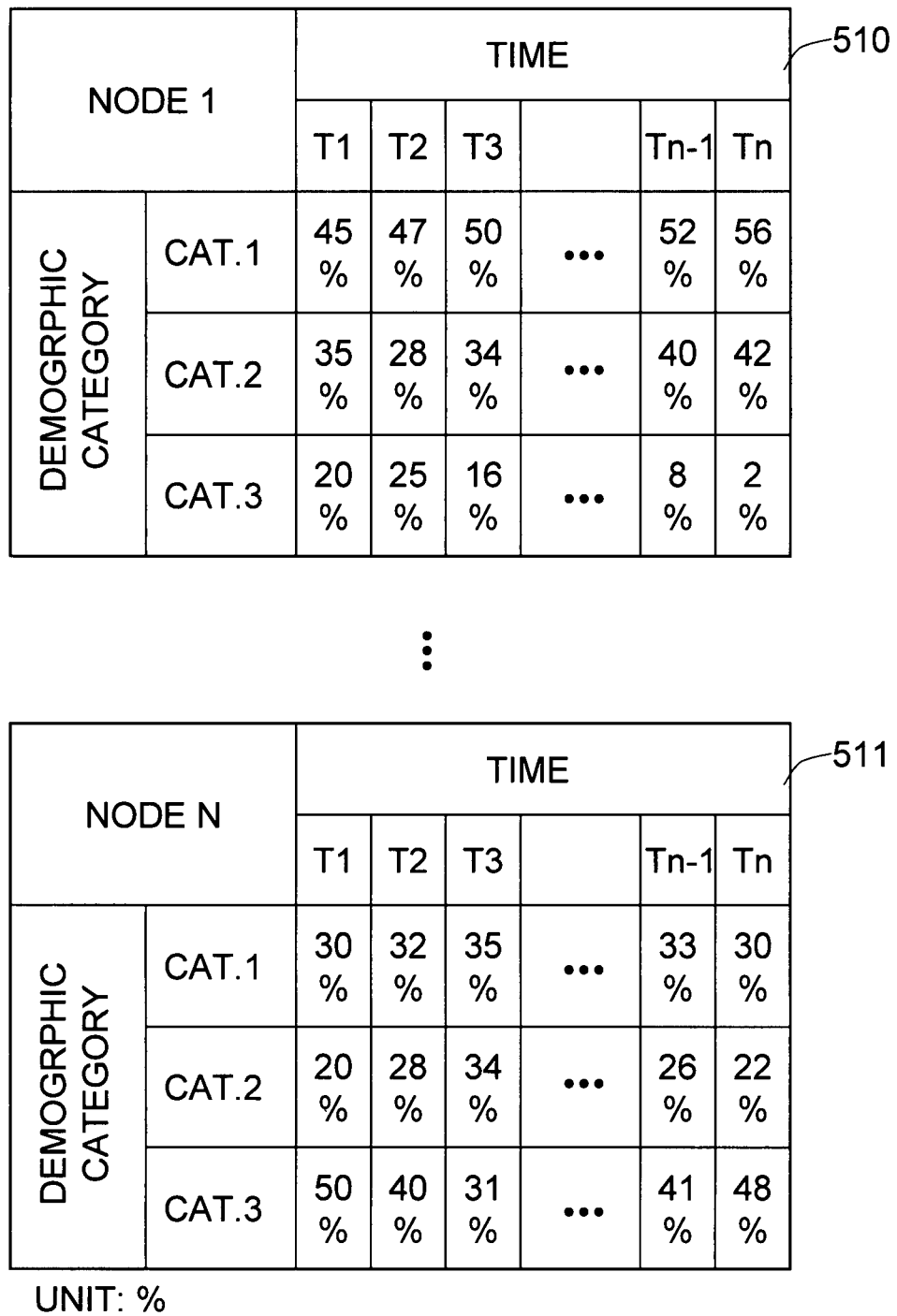

FIG. 13 shows exemplary statistics of the demographic information for each node in each site in a plurality of sites in a media network.

Figure 14:
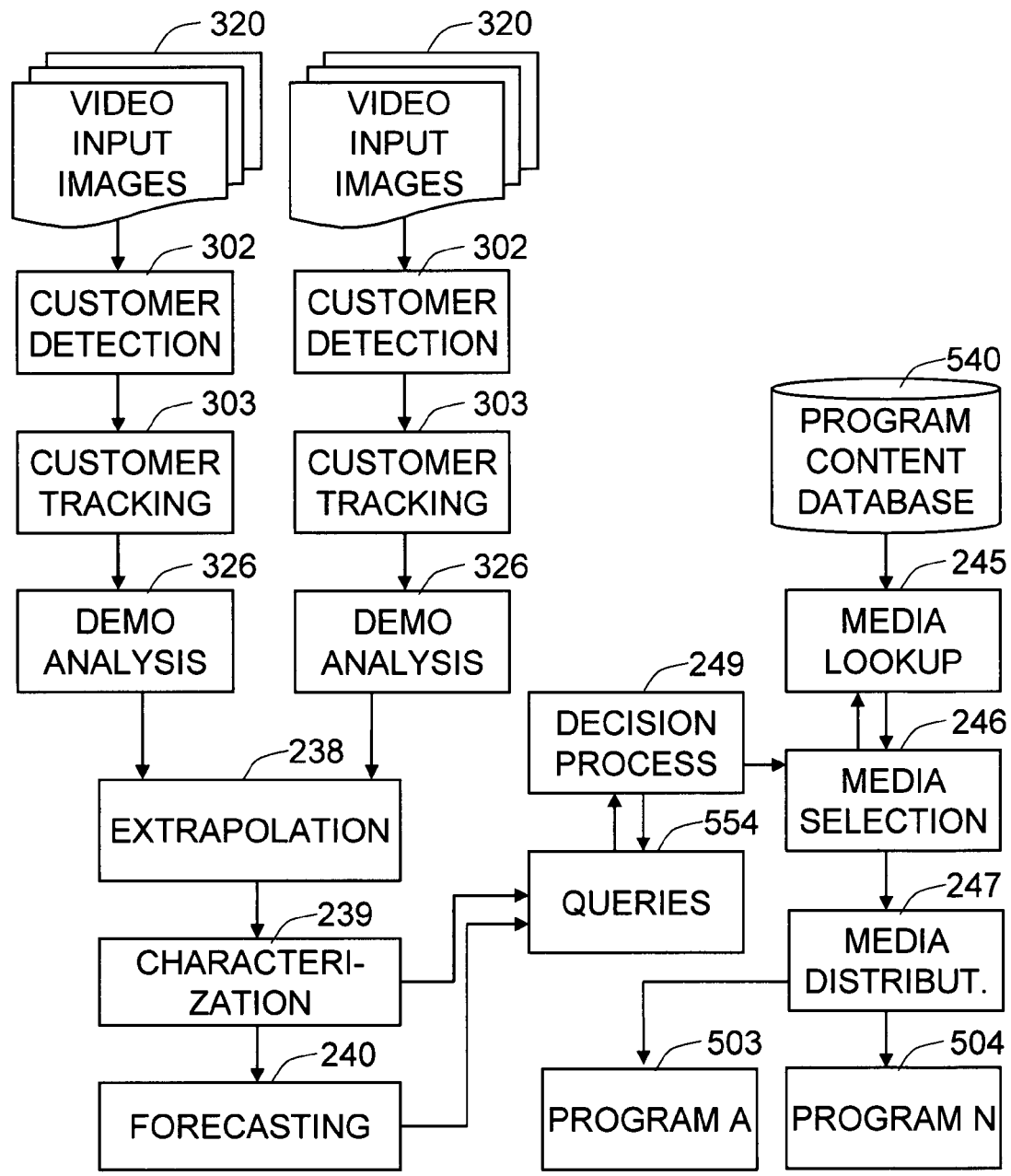

FIG. 14 shows exemplary processes in an exemplary embodiment of the invention, where the characterization and forecasting results are reported to the decision maker of a site or a media network through queries, so that the decision maker manually selects the programming contents based on the characterization and forecasting results and makes a decision about the distributed programming contents.

Figure 15:
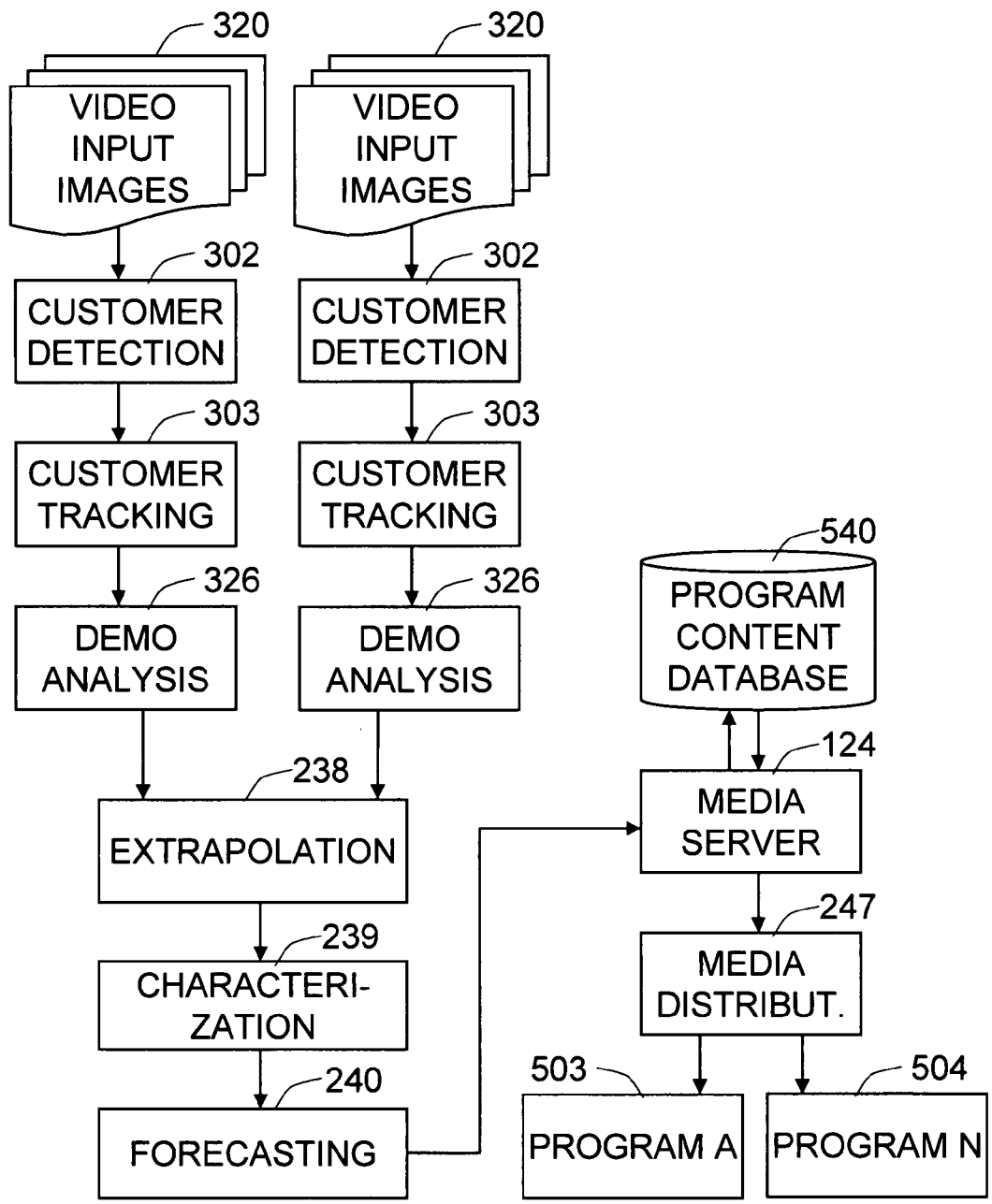

FIG. 15 shows exemplary processes in another exemplary embodiment of the invention, where the forecasting is passed to the media server rather than the decision maker of a site or a media network, so that the distribution of the forecast programming contents is processed automatically by the media server.

Figure 16:
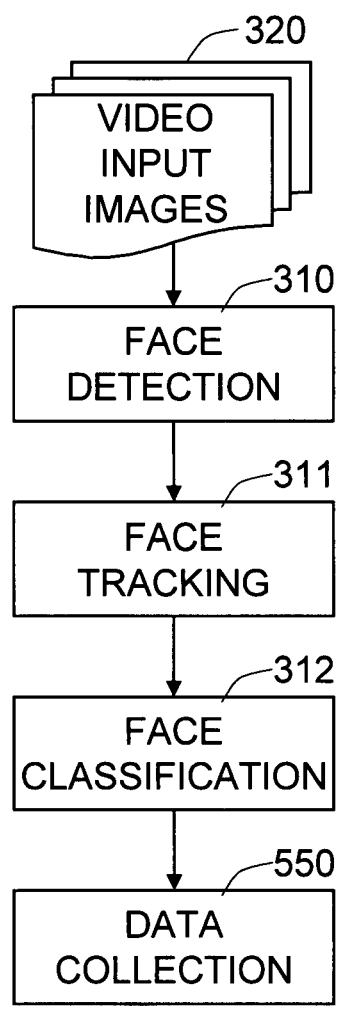

FIG. 16 shows an overview of demographics classification processes in an exemplary embodiment of the DBP.

Figure 17:
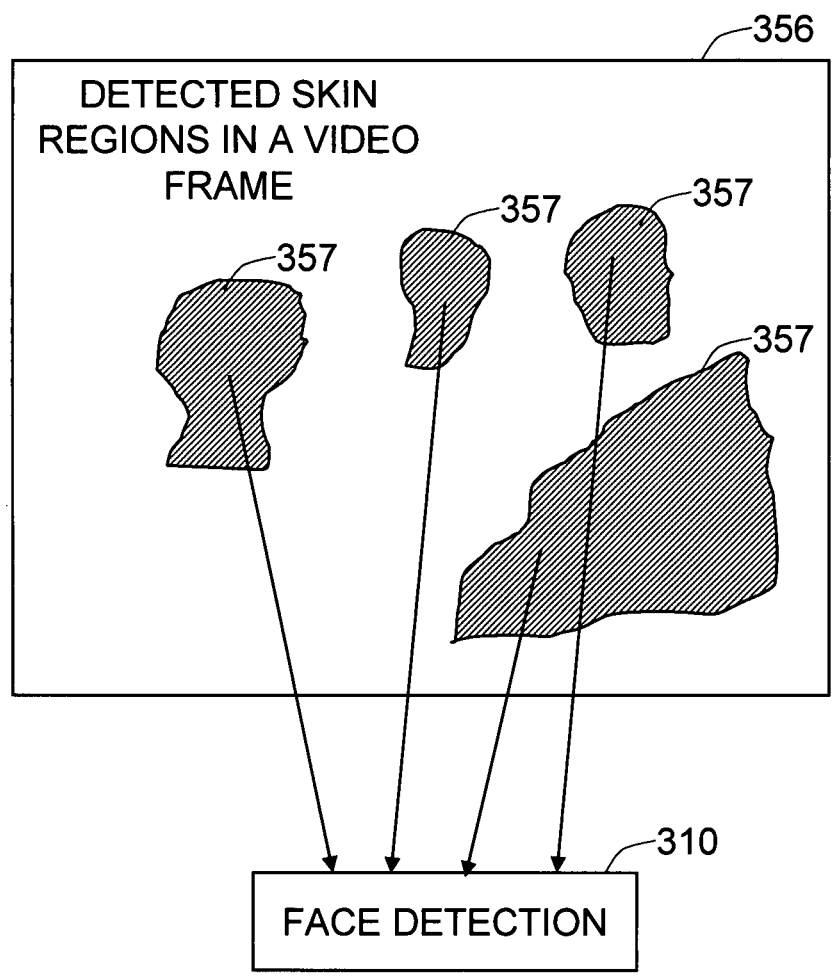

FIG. 17 shows an exemplary face detection process in the exemplary embodiment.

Figure 18:
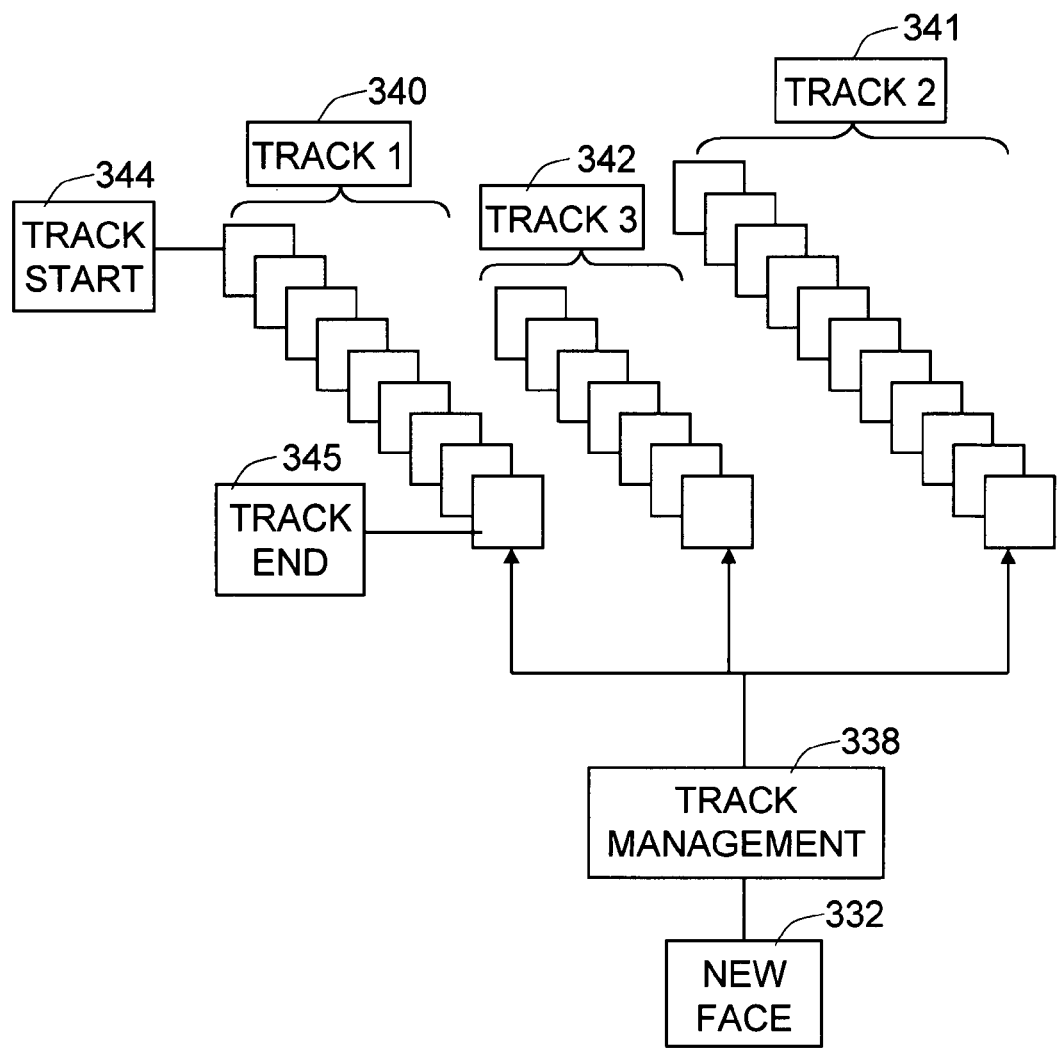

FIG. 18 shows an exemplary face tracking process in the exemplary embodiment, based on facial geometry estimation and appearance model building.

Figure 19:
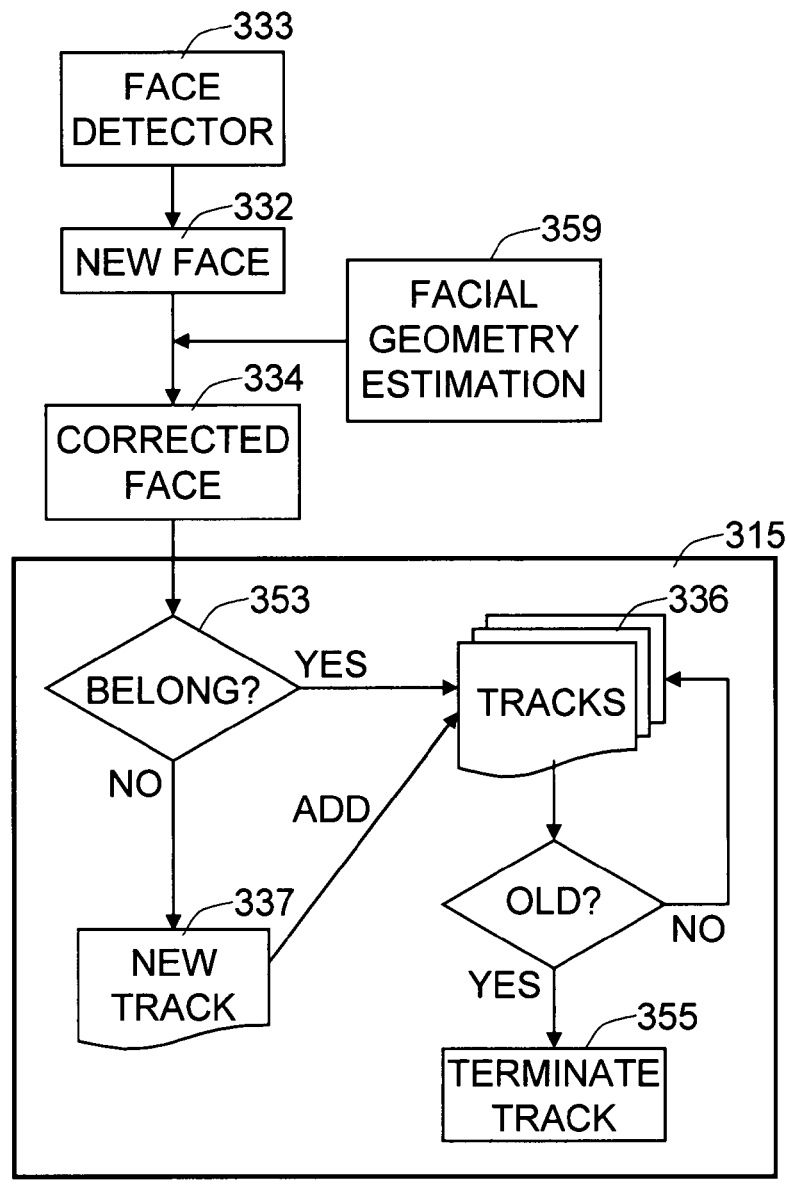

FIG. 19 shows an exemplary track management and verification of the face tracking process in the exemplary embodiment.

Figure 20:
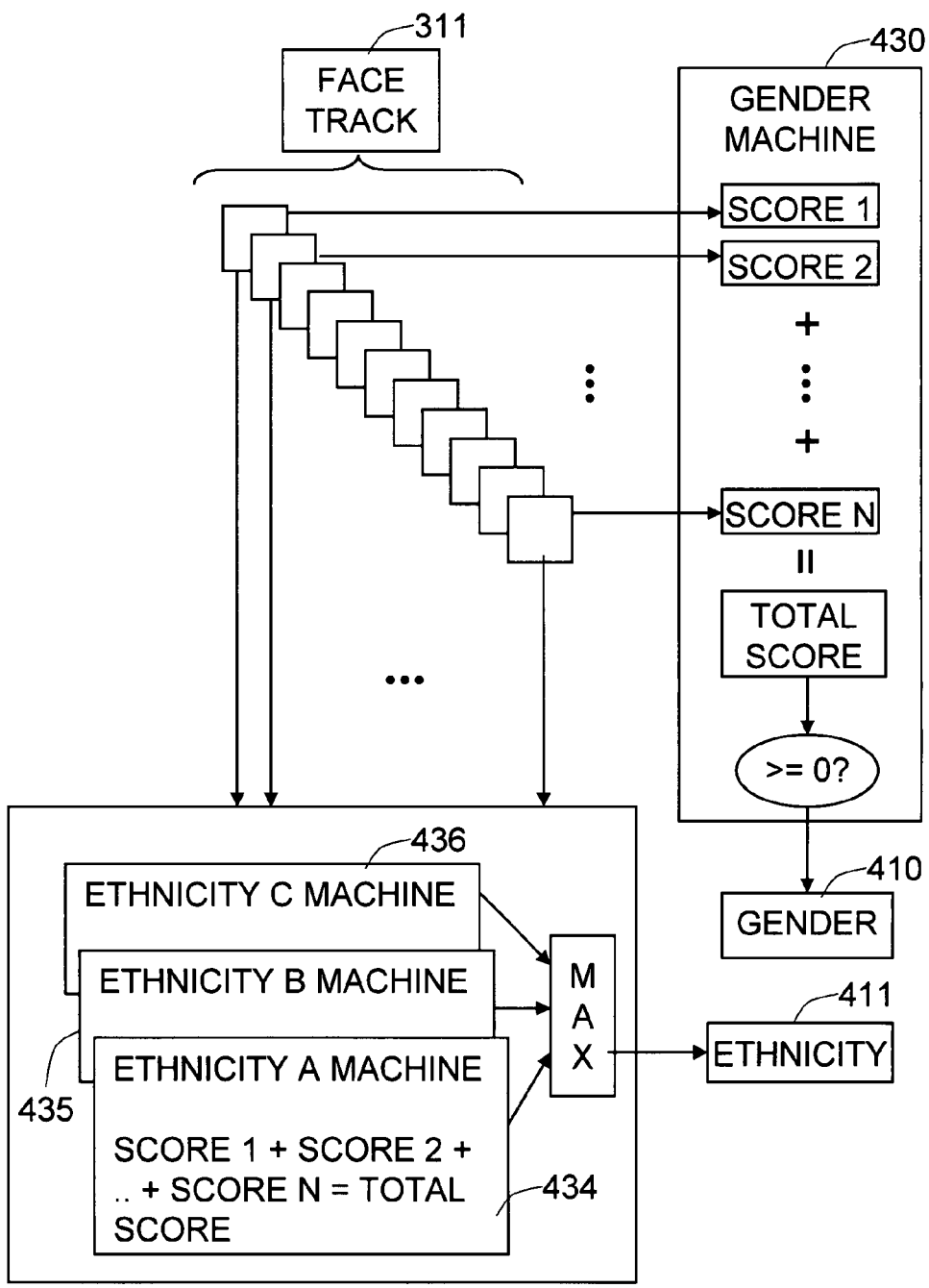

FIG. 20 shows an exemplary face classification based on gender and ethnicity in an exemplary embodiment of the DBP.

Figure 21:
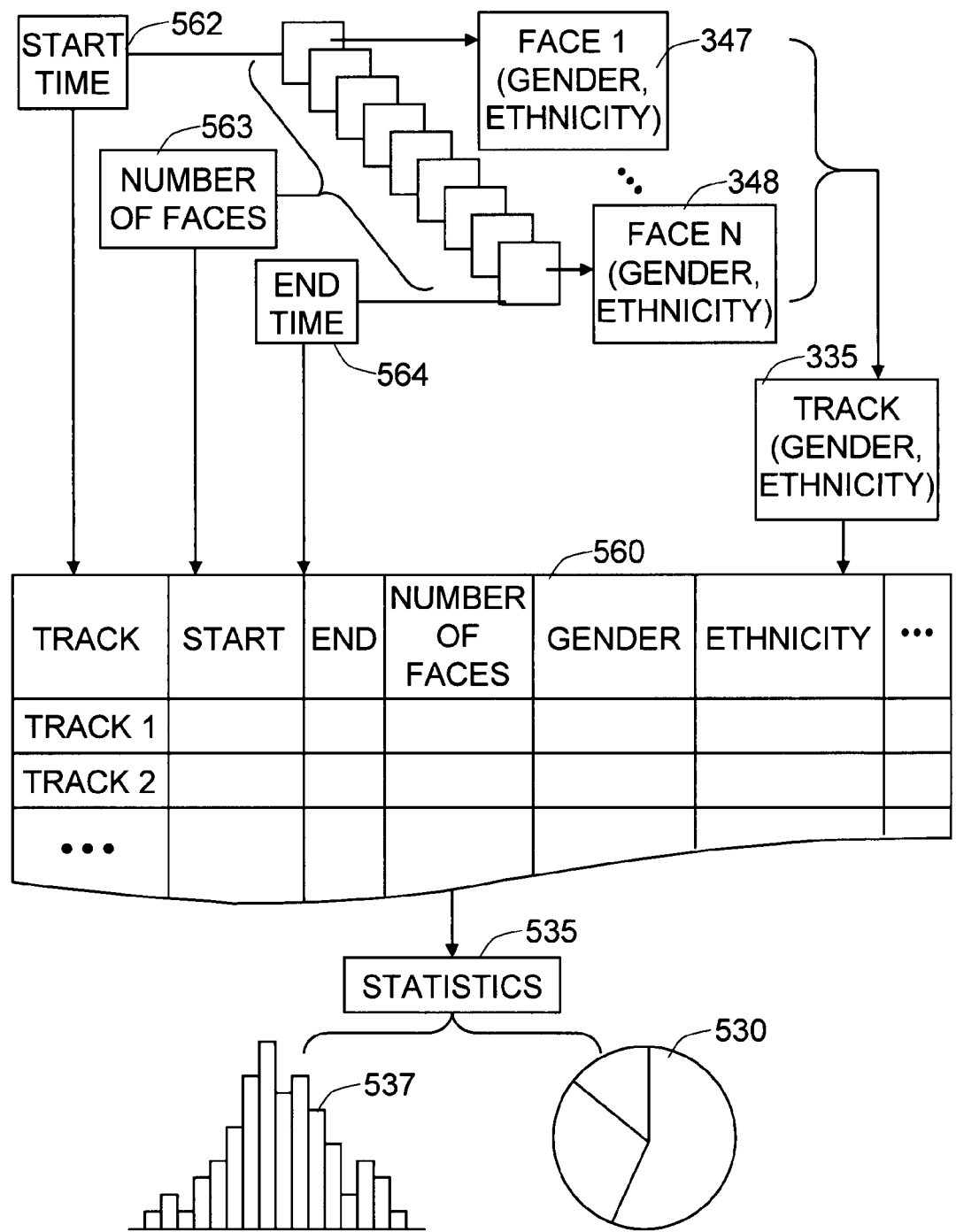

FIG. 21 shows an exemplary data storage process in an exemplary embodiment of the DBP.

Figure 22:
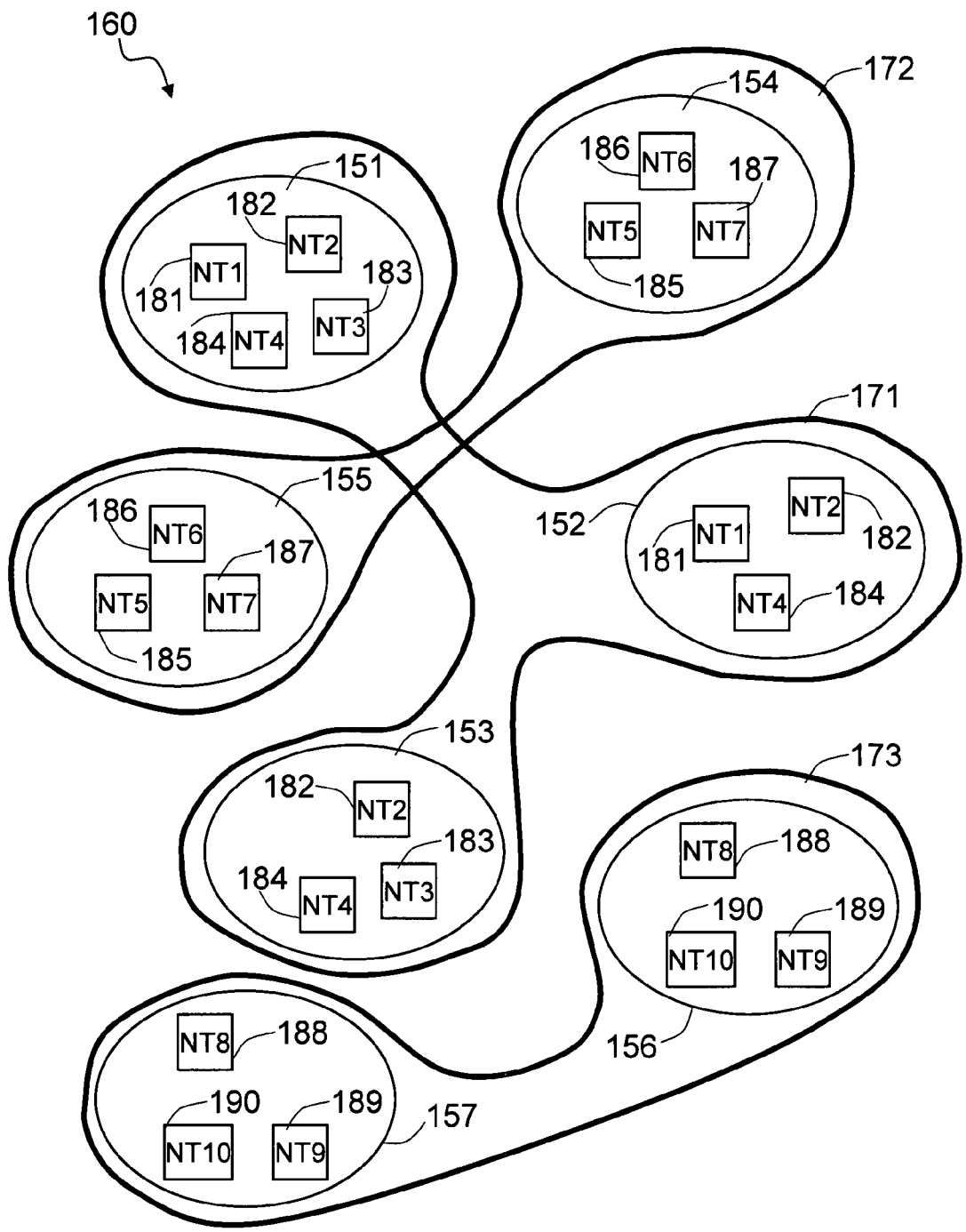

FIG. 22 shows an exemplary clustering of sites based on POS data and store layout as a part of the exemplary extrapolation process.

FIG. 23 shows an exemplary table for the category of clustered sites and an exemplary table for node type and information for the exemplary extrapolation process in the DBP based on the clustering of the sites.

Figure 24:
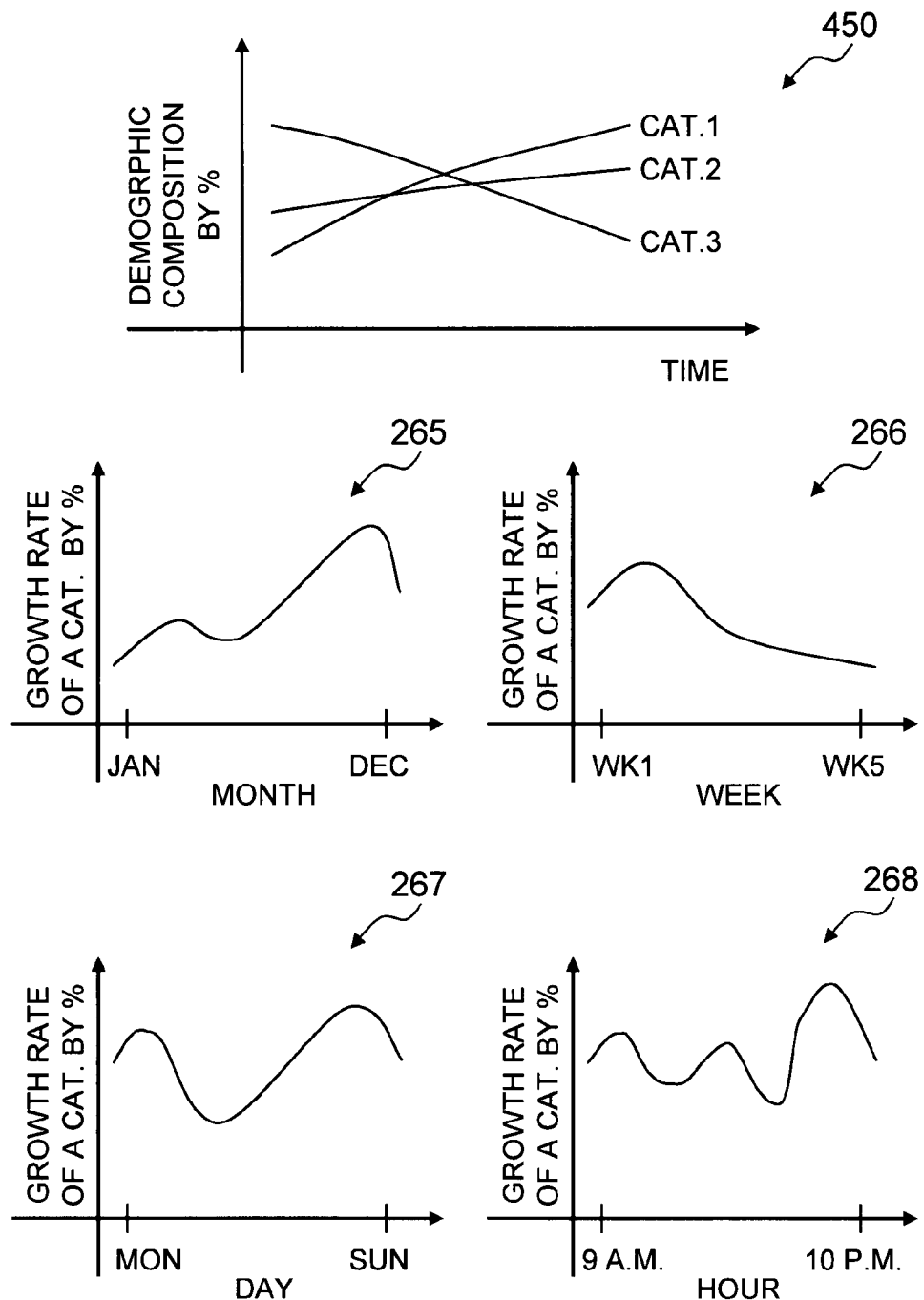

FIG. 24 shows demographic composition measurement, month of the year patterns, week of the month patterns, day of the week patterns, and hour of the day patterns in the forecasting process in an exemplary embodiment of the DBP.

Figure 25:
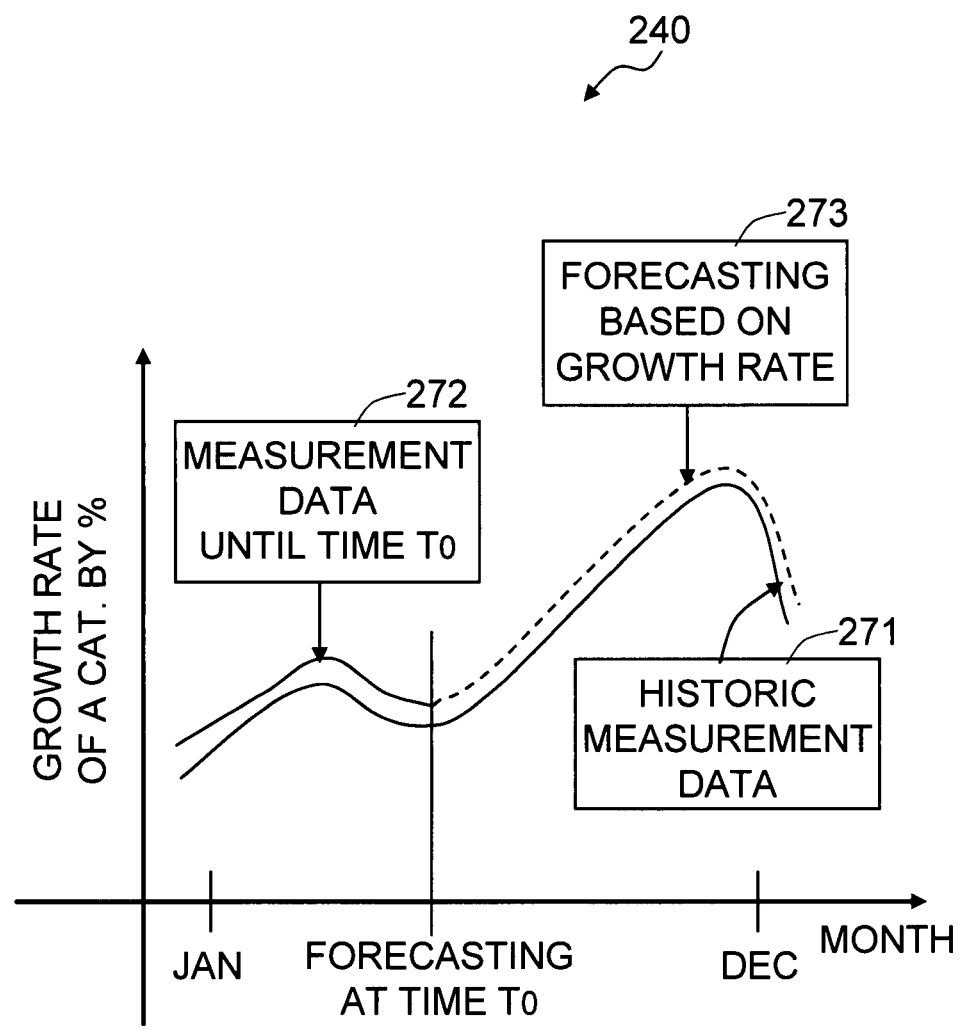

FIG. 25 shows an exemplary forecasting process in the exemplary embodiment of the DBP.

FIG. 26 shows exemplary factors that influence the accuracy of the forecast in an exemplary embodiment of the DBP.

DETAILED DESCRIPTION OF THE INVENTION

Figure 1:
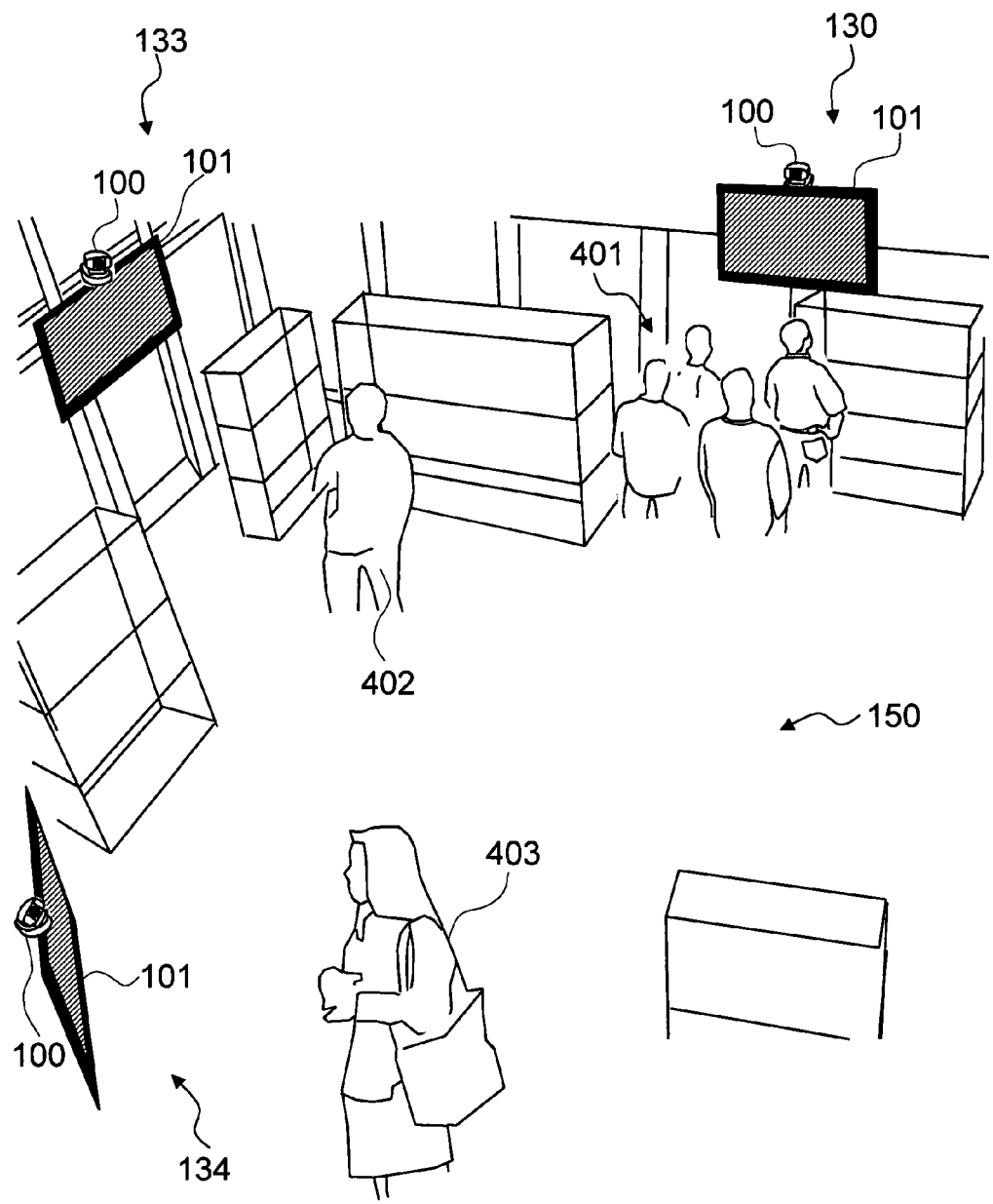
FIG. 1 is an overall view of a preferred embodiment of the invention in a site of a media network, where a media server distributes the programming contents to each node in the site based on the automatic classification and forecasting of the demographics for the customers by the invention.

FIG. 1 is an overall view of an exemplary embodiment of the invention in a site 150 of a plurality of sites in a media network 160, where a media server 124 distributes the customized programming contents to each node 130 individually of a plurality of nodes in the site 150, based on the automatic analysis of the demographic classification of the customers and forecasting 240 of the customers' demographics by the invention. The present invention is called demographic-based programming (DBP). In the exemplary embodiment of the DBP, a node 130 is defined as a 'means for playing output' 101. The node 130 can play audio and visual programming content sent by a media server 124 in the place where it is installed. In the exemplary embodiment, a 'means for capturing images' 100 can be logically attached to a node 130. The DBP provides automatic classification and forecasting 240 information for the customers' demographics in each node 130 to the media server 124 in order to help customize the programming content based on the actual data measurement 237, classification, and forecasting 240 by the invention. Therefore, the programming content for the 'customer A' 402 in a 'node A' 133 can be customized differently from the programming content for the 'customer B' 403 in a 'node B' 134. The DBP can also aggregate the demographic information measurements from each individual customer in order to find optimally customized programming content for 'a group of customers' 401 by applying the measurement 237 technology to the tracking of each customer.

Overview

The present invention, DBP, provides tailored audience measurement 237 steps for media networks in public spaces. The steps provide an understanding of audience composition and aid in the matching of content to specific targeted groups. The DBP leverages a proprietary automated demographic classification as well as its sampling 236, characterization 239 and forecasting 240 methods.

Sample Selection

The exemplary embodiment of the DBP works in concert with network owners and operators to gain a full understanding of each network to be characterized. Next, the exemplary embodiment selects a representative sample of nodes that reflects the breadth and variety of the nodes in the network. This selection process considers variables such as screen classes, geographic markets, site types, screen placements, etc. In another exemplary embodiment, it is possible the invention can measure the demographics from all the nodes rather than sample nodes. Whether the measurement 237 is performed at the sample nodes or entire nodes can be influenced by a plurality of variables, such as the complexity of the targeted measurement data, the goal of the market, and the size of the media network 160.

Measurement

Measurement 237 of the audience for the group of sample screens is carried out using an automated, computer vision based media measurement 237 and demographic segmentation system. These systems are installed in the vicinity of each node 130 in the measured nodes, and statistics about each node's addressable audience and that audience's demographic characteristics are collected. In the DBP, the attachment of these systems to each node 130 is logically defined. Therefore, the DBP allows a certain degree of flexibility in the installation locations between these systems and the node 130.

Network and Screen Characterization

Using statistical methods, the embodiment can provide network-wide and node-level characterizations for each node 130 in the network based on the measurements obtained at the nodes. Characterizations are provided for a given window of time, and detail a node's audience demographics for that time increment. These characterizations provide the basis for validating current media content, its relevance to the current audience and forecasting 240 the audience composition for more targeted future media purchases and placements.

Audience Forecasting

Based on the screen-level characterization 239 of the network, derived from actual measurements of audience demographics over a given period, the invention forecasts the screen and network characterization. The forecasting 240 can also be modified based on past characterization data, seasonal and other trends in an embodiment.

Figure 2:
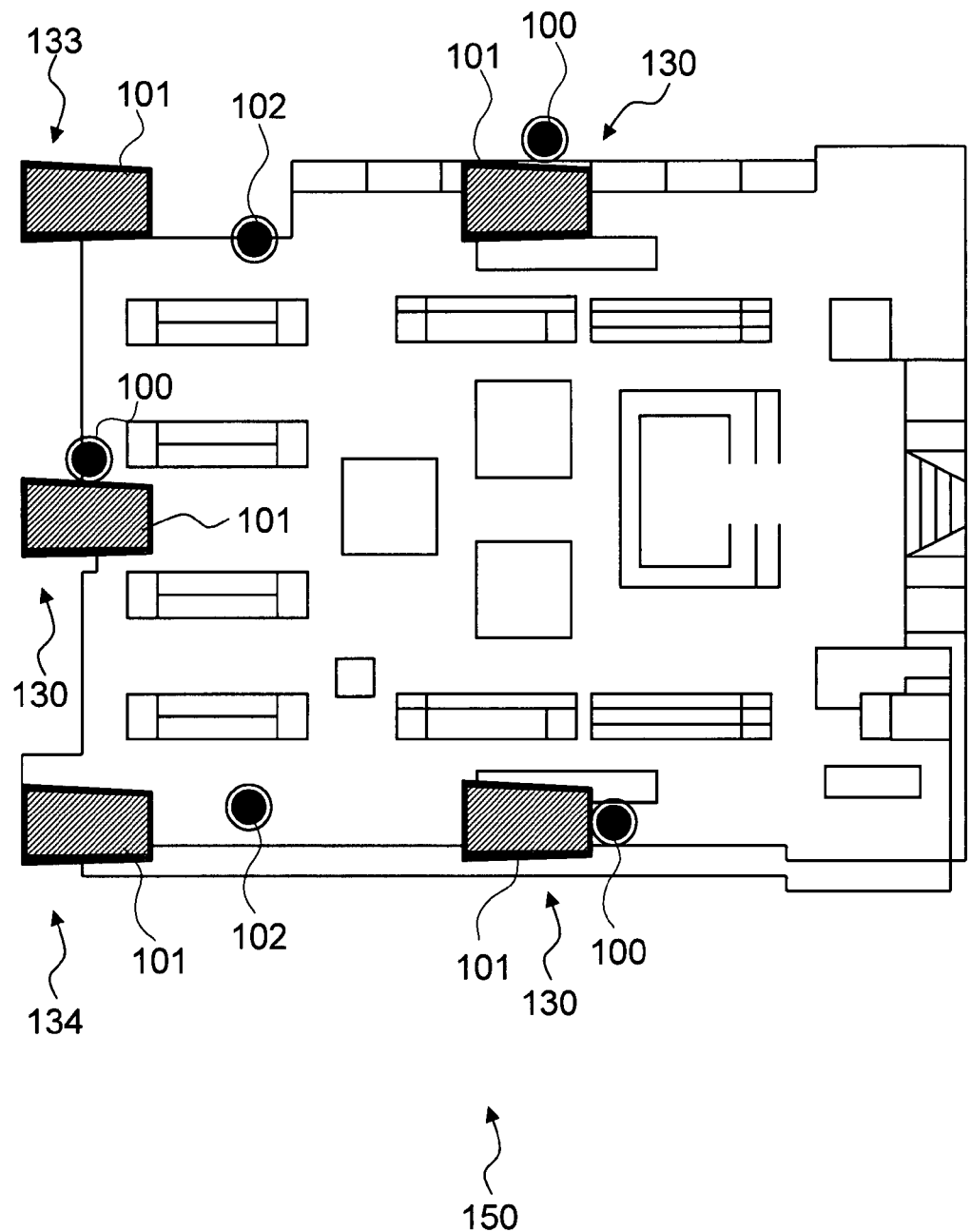
FIG. 2 shows a layout view of another preferred embodiment of the invention in a site, which shows that the disclosed invention allows the installation location of the means for capturing images to be separated from the installation location of the means for playing output.

FIG. 2 is an overall layout view of another preferred embodiment of the invention in a site 150. In exemplary embodiments of the invention, the DBP does not require the means for capturing images 100 for media measurement 237 and demographic segmentation to be collocated with the node 130 strictly. Therefore, in FIG. 2, the second means for capturing images 102 are not attached to the 'node A' 133 nor 'node B' 134, while each of the other means for capturing images 100 are attached to each node 130. As long as the second means for capturing images 102 can see the customers in the vicinity of the node 130 in its field of view, it can be installed detached from the node 130. This feature gives more flexibility in installing the system in a site 150, so that the owner of a particular site 150 can utilize pre-existing means for capturing images 100 and second means for capturing images 102 in the site 150.

Figure 3:
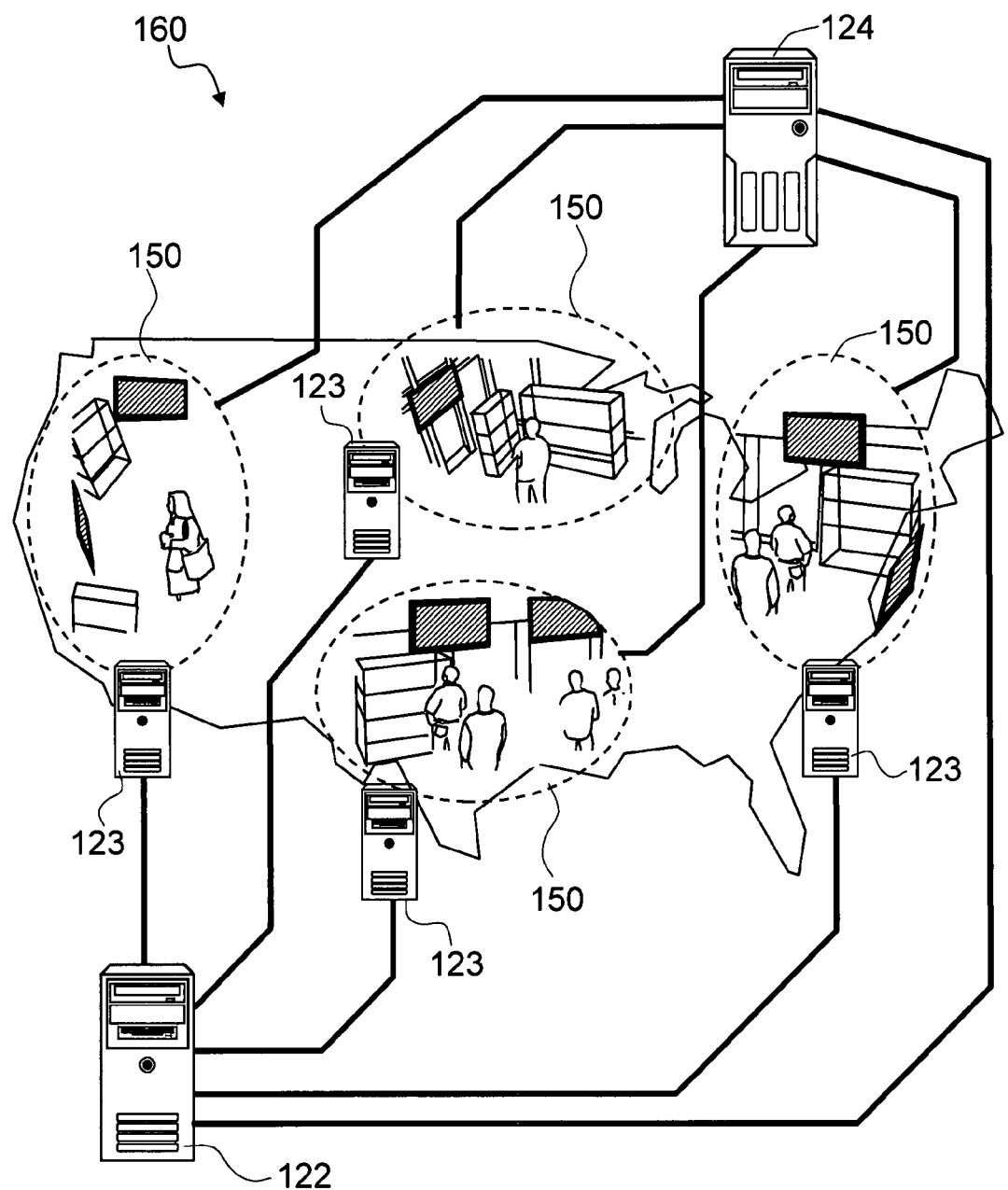
FIG. 3 shows an exemplary media network with a preferred embodiment of the invention, where the media network consists of a plurality of sites, and each site of the plurality of sites serves a plurality of nodes.

FIG. 3 shows an exemplary media network 160 with a preferred embodiment of the invention, where the media network 160 consists of a plurality of sites, and each site 150 of the plurality of sites serves a plurality of nodes. The Vision Processing Unit (VPU) 123 in each site 150 processes the measurement 237 of the customer demographics for each measured node 130. Then, the measurement 237 data from each Vision Processing Unit (VPU) 123 is sent to the central server 122, which processes extrapolation 238, characterization 239, and forecasting 240 of the customer demographics for each node 130 in the plurality of nodes in the media network 160. The information for the characterization 239 and forecasting 240 of the customer demographics is sent to a media server 124, which customizes the programming contents for each node 130 in the plurality of nodes in the media network 160 based on the information.

Figure 4:
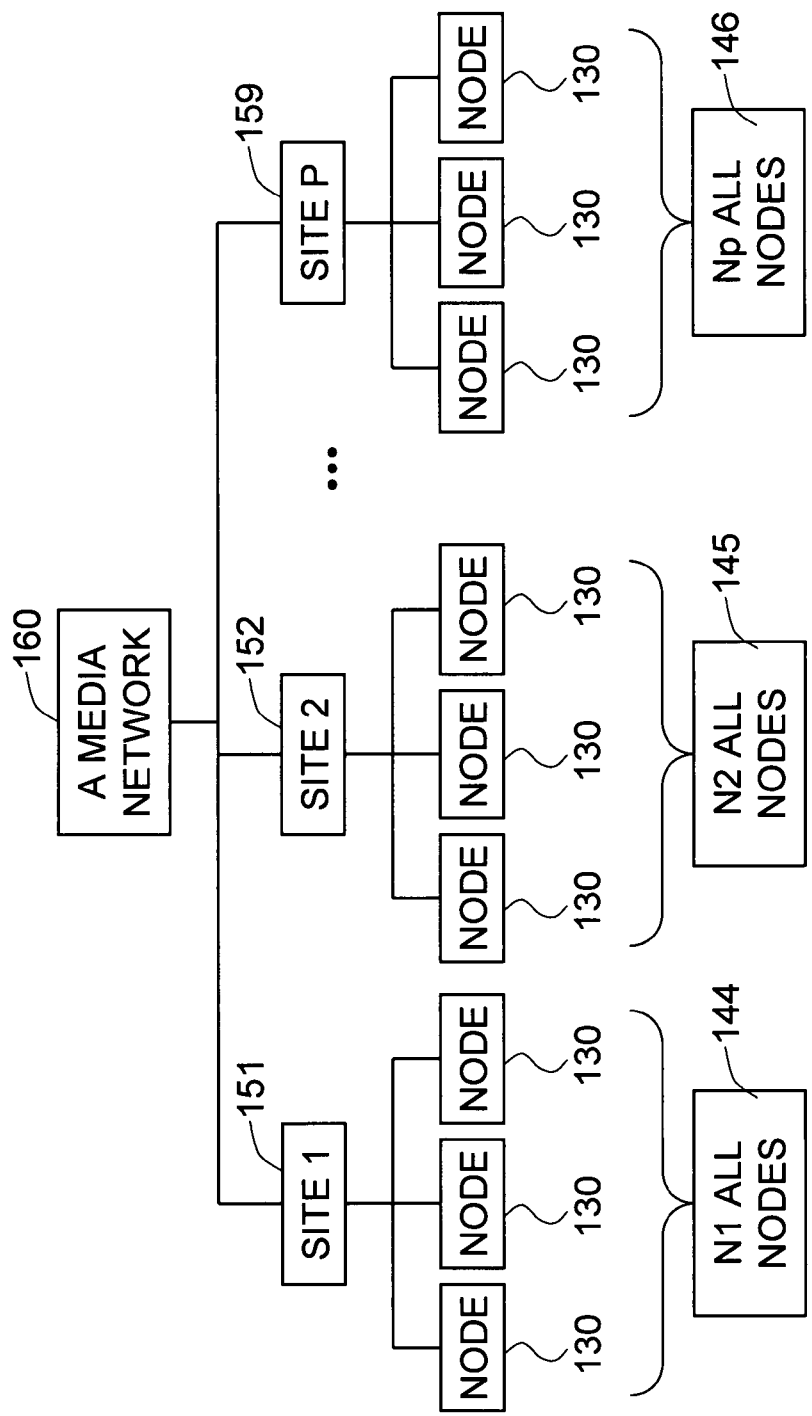
FIG. 4 shows the hierarchy of an exemplary media network with an exemplary embodiment of the invention, where the media network consists of a plurality of sites, and every node of each site of the plurality of sites is used for the demographics measurement.
Figure 5:
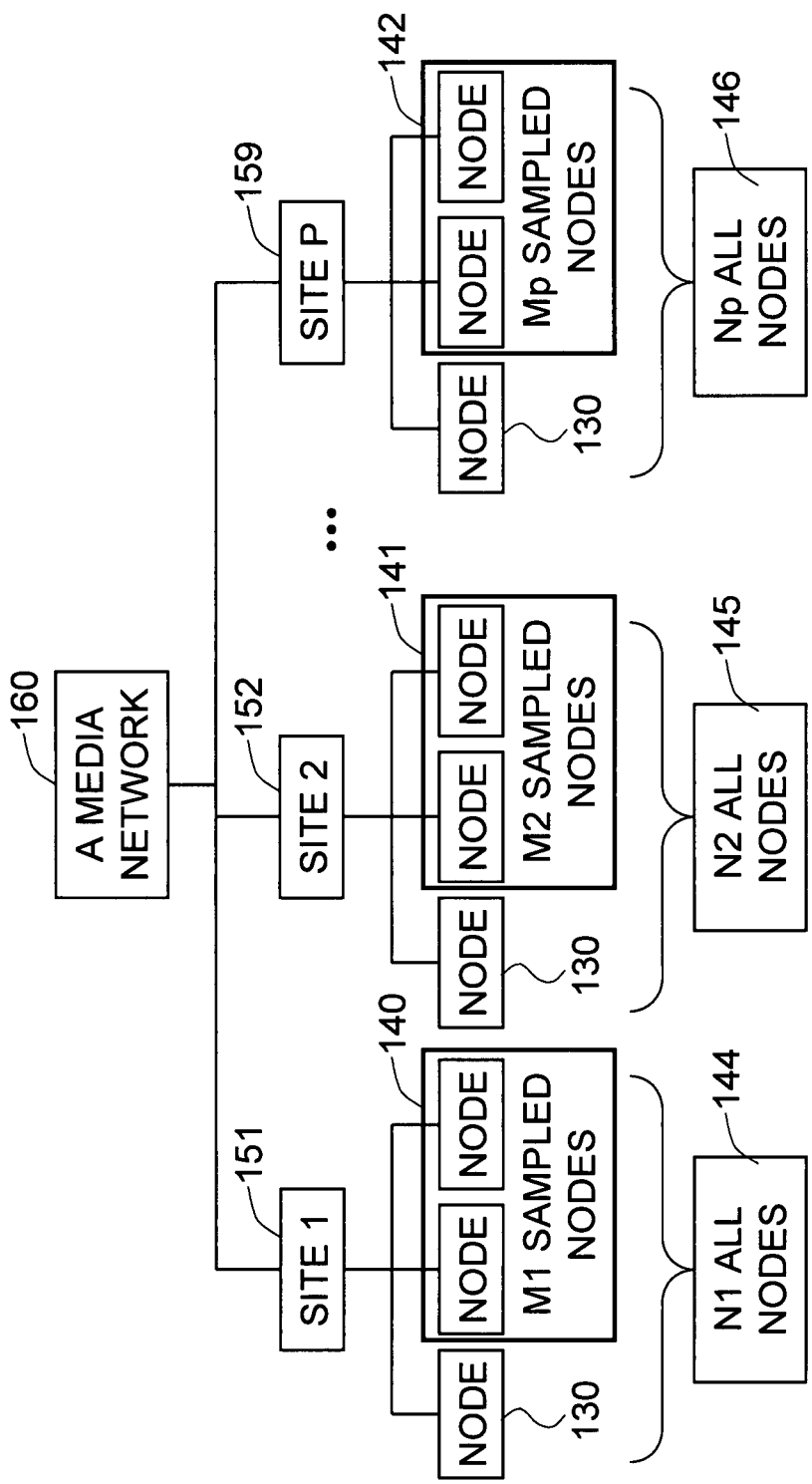
FIG. 5 shows the hierarchy of another exemplary media network with an exemplary embodiment of the invention, where the media network consists of a plurality of sites, and some of the nodes of each site of the plurality of sites are sampled for the demographics measurement.

FIG. 4 shows the hierarchy of an exemplary media network 160 with an exemplary embodiment of the invention, where the media network 160 consists of a plurality of sites, and every node 130, such as 'N1 all nodes' 144 in the 'site 1' 151, 'N2 all nodes' 145 in the 'site 2' 152, and 'Np all nodes' 146 in the 'site p' 159, in the plurality of sites, is used for the demographics measurement 237. FIG. 5 shows the hierarchy of another exemplary media network 160 with an exemplary embodiment of the invention, where the media network 160 consists of a plurality of sites, and some of the nodes of each site 150 in the plurality of sites are sampled as sampled nodes 132 for the demographics measurement 237. In FIG. 5, 'M1 sampled nodes' 140 out of 'N1 all nodes' 144 in the 'site 1' 151, 'M2 sampled nodes' 141 out of 'N2 all nodes' 145 in the 'site 2' 152, and 'Mp 142 sampled nodes' out of 'Np all nodes' 146 in the 'site p' 159, in the plurality of sites, are sampled for the demographics measurement 237. FIG. 6 further shows the hierarchy of another exemplary media network 160 with an exemplary embodiment of the invention, where the media network 160 consists of a plurality of sites, and some of the nodes across the media network 160 are sampled for the demographics measurement 237. In the exemplary embodiment in FIG. 6, the 'M sampled nodes' 139 are selected across the media network 160, while the sampled nodes, such as 140, 141, and 142, in the exemplary embodiment in FIG. 5 are selected within each site 150.

FIG. 7 shows exemplary pie charts of the exemplary demographic information measurement 237 from a means for capturing images 100 for a node 130. In FIG. 7, an exemplary 'pie chart for age classification' 531, an exemplary 'pie chart for gender' 532, and an exemplary 'pie chart for ethnicity' 533 are shown. The DBP enables the decision maker in a site 150 or a media network 160 to query the characterization 239 and forecasting 240 information, which is processed based on the actual measurement 237 for the customers' demographics. FIG. 8 shows an exemplary embodiment of the demographic information measurement 237 and exemplary method for generating useful marketing reports to the decision maker at the decision process 249 in a site 150 or a media network 160 through queries 554. The pie charts in FIG. 7 can provide useful characterization 239 and forecasting 240 information in the report generation 555 step to the decision maker in a site 150 or a media network 160. In the exemplary embodiment, the measurement 237 process can comprise a data aggregation 551 process and data filtering 553 process.

FIG. 9 shows exemplary steps in an exemplary embodiment of the invention, where the steps consist of the automatic demographics measurement 237 from all the nodes in each site 150 of a media network 160, the extrapolation 238 of the measurement 237, the characterization 239 of the demographic information for each node 130, and the forecasting 240 of the demographic characterization 239 to help customize programming contents for each node 130. In the exemplary embodiment, the automatic demographics measurement 237 is performed for all the nodes, node A 133, node B 134, node M 135, and node N 136, in the media network 160, and the forecasting 240 of the demographic characterization 239 is also performed for each of the nodes.

FIG. 10 shows exemplary steps in another exemplary embodiment of the invention, where the steps consist of the automatic demographics measurement 237 from the sampled nodes rather than all nodes in a media network 160. In the exemplary embodiment in FIG. 10, the sampling 236 of nodes can be performed across the media network 160 or within each site 150 in a plurality of sites in the media network 160. Therefore, the sampled node SB 137 and sampled node SM 138 can be selected across the media network 160 or within each site 150 in a plurality of sites in the media network 160. FIG. 10 also shows that the exemplary embodiment further comprises the extrapolation 238 of the measurement 237 from the sampled nodes, the characterization 239 of the demographic information for each node 130, and the forecasting 240 of the demographic characterization 239 to help customize programming contents for each node 130.

FIG. 11 shows exemplary steps in another exemplary embodiment of the invention, where the steps consist of the automatic demographics measurement 237 from the sampled nodes in a media network 160, the extrapolation 238 of the measurement 237, the characterization 239 of the demographic information for each node 130, the forecasting 240 of the demographic characterization 239 to help customize programming contents for each node 130, the record keeping of the forecasting 240 information in each node 130, and the utilization of the historical forecasting information record to modify the current forecasting 240 step. In the exemplary embodiment shown in FIG. 11, each node 130 keeps track of the forecasting 240 information, 'historical data for node A' 543, 'historical data for node B (sampled)' 544, 'historical data for node M (sampled)' 545, and 'historical data for node N' 546, and the historical data is used to modify the next forecasting 240 process. The duration for the past data in the history of characterization 239 is decided by the decision maker of the particular embodiment in the media network 160.

FIG. 12 shows exemplary steps in another exemplary embodiment of the invention, where the steps consist of the automatic demographics measurement 237 from the sampled nodes in a media network 160, the extrapolation 238 of the measurement 237, the characterization 239 of the demographic information for each node 130, the forecasting 240 of the demographic characterization 239 to help customize programming contents for each node 130, the record keeping of the forecasting 240 information in each node 130, the utilization of the historical forecasting 240 information record to modify the current forecasting 240 step, and the utilization of additional Input 243 to modify the current forecasting 240 step. The additional Input 243 that influences the forecasting 240 can be based on past characterization 239 data, seasonal and other trends in an embodiment.

FIG. 13 shows exemplary statistics of the demographic information for each node 130 in each site 150 in a plurality of sites in a media network 160. In the exemplary embodiment, as shown in the exemplary 'output of characterization for node A' 510 and 'output of characterization for node N' 511, the characterizations are provided for a given window of time, such as from Tn−1 to Tn, and the DBP details a node's audience demographics for that time increment. Each window of time, such as from Tn−1 to Tn, and the entire duration of the measurement 237 period from T1 to Tn can be decided based on various business goals and level of desired information composition in the media network 160.

FIG. 14 shows exemplary processes in an exemplary embodiment of the invention. The DBP detects 302 each customer from the input images, and then tracks 303 the customer in the vicinity of a node 130. A computer vision based automatic demographic classifier analyzes 326 the demographics of the customer. The demographic information is extrapolated 238 for the characterization 239 and forecasting 240 of the customer demographics in each node 130. The characterization 239 and forecasting 240 results are reported to the decision maker of a site 150 or a media network 160 through queries 554. The decision maker can manually select 246 the programming contents based on the characterization 239 and forecasting 240 results and make a decision about the distributed programming contents. In an exemplary decision process 249 of the exemplary embodiment, the decision maker can look up 245 the programming contents in a programming content database 540 and process media distribution 247 of the selected media, such as 'program A' 503 and 'program N' 504, in the media network 160.

FIG. 15 shows exemplary processes in another exemplary embodiment of the invention, where the forecasting 240 is passed to the media server 124 rather than the decision maker of a site 150 or a media network 160. In this exemplary embodiment, the media server 124 processes the media distribution 247 of the forecast programming contents automatically, utilizing the direct feedback of customer demographic forecasting 240 from the DBP.

FIG. 16 shows an overview of exemplary demographics classification processes in an exemplary embodiment of the DBP. In the exemplary embodiment, the DBP aims to automatically measure the demographic composition of the audience viewing an advertisement display, by processing the video input images 320 from a means for capturing images 100, such as a camera, attached to the means for playing output 101, such as a display. The system takes live video as an input, detects 310 people's faces in the video, individually tracks 311 them, and classifies 312 the faces into one of the demographics groups. The measured demographic composition of the viewers is used to dynamically re-program the display materials to match the current target audience. For this embodiment, a general-purpose color video camera can be used as the means for capturing images 100 to deliver video frames to the computer via USB or IEEE1394 connection. A wide-angle lens may be preferred to capture as many instances of faces as possible.

FIG. 17 shows an exemplary face detection 310 process in the exemplary embodiment. In the exemplary embodiment, the DBP first processes the skin tone segmentation 356. At the skin tone segmentation 356 step, the module first segments out the area in the video frame where the human faces are likely to be present, using color information. The scheme utilizes a color space transformation, so that the skin tone forms a compact region in the transformed space. The skin tone detection serves as a means to speed up the face detection 310, which is a major bottleneck in face processing. The skin tone detection also significantly reduces falsely detected faces from the background; this feature is especially beneficial when the system needs to detect human faces against the complex background present in typical public scenes. The output from this step is a collection of masked regions, for the detected skin region 357, in the video frame.

Next, a face detection 310 process follows. A machine learning based approach may be employed to detect faces within the skin tone region determined by the previous step. This step operates on an image converted to gray scale to detect faces. The subsequent processing assumes gray scale video frames. The step provides the system with the locations and sizes of detected faces in the given video frame.

FIG. 18 and FIG. 19 show an exemplary face tracking process in the exemplary embodiment, based on facial geometry estimation 359 and appearance model building. In the exemplary embodiment of the DBP shown in FIG. 19, once a face is detected, it goes through the automatic facial geometry correction step by the facial geometry estimation 359. This step is necessary because the faces detected from the face detection 310 algorithm have some range of positional and size errors. The detector also accepts modestly tilted faces, and largely ignores such variation. These geometric parameters (position, size, orientation) are estimated using a novel facial geometry estimation 359 scheme. The estimated facial geometry is used to correct the given face image so that the facial features are placed on standard locations in the 30×30 cropped face image chip.

The face correction step serves two purposes: a robust facial appearance model building for face tracking and the improvement of face classification. This step greatly helps to build a reliable facial appearance model across the track history, so that the given input face has a correct match to one of the accumulated models of the people present in the scene. On the other hand, when the faces are automatically aligned, the accuracy of face classification (gender and ethnicity) is improved significantly.

FIG. 18 and FIG. 19 also show an exemplary track management 338 and face track verification 315 of the face tracking process in an exemplary embodiment. In the exemplary embodiment of the DBP, the tracking step serves as a means to keep the identity of a person in the scene. The system can then accumulate the face classification scores across the faces in the face track, so that the classification accuracy is further improved.

The track management utilizes two measurements; the geometric and appearance match between the track history and the newly detected face. The track management 338 serves as a means to generate a new track 337 when a new face 332 of a person appears in the scene, to assign detected faces to tracks 336 to keep identities of people, and to terminate 355 a track when the person is out of the scene.

When new faces are detected in the current video frame, the track management 338 constructs a table of faces and tracks. Then it computes the geometric match and appearance match scores of each (face, track) pair that measure the likelihood of the given face belonging 353 to the given track.

The geometric match score can be based on the difference in the position, size, and the time between the new face and the last face in the track.

The appearance match score measures the difference between the model face appearance stored in the track, and the new face. If the total score (geometric+appearance) is below a predetermined threshold, the pair is excluded from the table. The pair having the highest score gets the assignment: from the face to the track. The procedure is repeated until all the faces are assigned to matching tracks.

However, if there is a new person in the scene, the face will not have a match to existing tracks. In that case, the threshold will have excluded the face, and the face will remain in the queue. The face then generates a new track 337, and the track is added to the list of tracks. For every frame, if a certain track didn't have a new face for more than a pre-specified time period, the track management 338 terminates 355 the track.

FIG. 20 shows an exemplary face classification based on gender 410 and ethnicity 411 in an exemplary embodiment of the DBP.

Gender Classification

In the exemplary embodiment, a machine learning based classifier, gender machine 430, may be used for gender recognition. The faces that are corrected, as described in the previous exemplary steps, are used for training the learning machine for gender classification; the test faces go through the same procedure as the training faces. In the exemplary embodiment, the classifier (the learning machine) is trained to output the gender score: −1 for female and +1 for male.

The tracking stage will group individual faces into person tracks; each person track is assigned a gender label by adding up the gender scores of the faces belonging to the track. If the accumulated score is negative, then the person is labeled as female, and if the accumulated score is positive, then the person is labeled as male.

Ethnicity Classification

In the exemplary embodiment of the DBP shown in FIG. 20, the system can classify the faces into designated classes of ethnic groups. The system can employ the same number of learning machines as the number of ethnic groups. Each learning machine is tuned to the given ethnic group; for example, when there are three (A, B, C) ethnic groups, the 'learning machine for ethnicity A' 434 is trained to output +1 for the faces from group A, and −1 for faces from groups B or C. The 'learning machine for ethnicity B' 435 is trained to output +1 for the faces from group B, and −1 for faces from groups A or C. Likewise, the 'learning machine for ethnicity C' 436 is trained to output +1 for the faces from group C, and −1 for faces from groups A or B.

The corrected input face image is fed to all of the learning machines, and the machines output scores. As in the gender classification, the scores from all of the faces in the person track are added up. The accumulated ethnicity score of the person track provides a more reliable ethnicity signature of the person's face than the individual scores do.

The rule of decision is that when a given face has a positive score from the learning machine A, then the face is classified as belonging to the ethnic group A. There can be cases where a face will have positive scores for more than one class. The DBP can resolve the ambiguity by assigning the ethnic group having the maximum score to the face in the exemplary embodiment.

Although FIG. 20 shows an exemplary face classification based on gender and ethnicity attributes in an exemplary embodiment of the DBP, the described computer vision technologies can be applied to other face classification attributes, such as age, based on the visual information from the face captured by the means for capturing images 100.

FIG. 21 shows an exemplary data storage process in an exemplary embodiment of the DBP. In the exemplary embodiment, the system stores the data as a table 560, where each track has fields of values: time stamps (start time 562 for face appearance and end time 564 for face disappearance), the number of faces 563, and gender 410 and ethnicity 411 labels. The data is used to collect statistics 535 of gender and ethnic composition of the audience, and the statistics 535 can be represented as a pie chart 530, as a bar graph 537 or any data representation means in the exemplary embodiment. The data is accessible by the programming module, so that the system can reprogram the display material according to the demographics composition.

FIG. 22 shows an exemplary clustering of sites based on POS data and store layout as a part of the exemplary extrapolation process. In the exemplary embodiment, sites with similar node types are clustered together. The node types are defined based on the POS data and the relative location of the node in the store layout in each site. For example, the 'site cluster 1' 171 can comprise 'site 1' 151, 'site 2' 152, and 'site 3' 153, in the exemplary embodiment. Similarly, the 'site cluster 2' 172 can comprise 'site 4' 154 and 'site 5' 155, and the 'site cluster 3' 173 can comprise 'site 6' 156 and 'site 7' 157, in the exemplary embodiment.

The 'site 1' 151, 'site 2' 152, and 'site 3' 153 in the 'site cluster 1' 171 can comprise 'node type 1' (NT1) 181, 'node type 2' (NT2) 182, 'node type 3' (NT3) 183, and 'node type 4' (NT4) 184. Similarly, the 'site 4' 154 and 'site 5' 155 in the 'site cluster 2' 172 can comprise 'node type 5' (NT5) 185, 'node type 6' (NT6) 186, and 'node type 7' (NT7) 187. Furthermore, the 'site 6' 156 and 'site 7' 157 in the 'site cluster 3' 173 can comprise 'node type 8' (NT8) 188, 'node type 9' (NT9) 189, and 'node type 10' (NT10) 190.

However, not all the sites may have the same number of node types. In the exemplary embodiment, the 'site 1' 151 comprises all of the four different node types while the 'site 2' 152 comprises only 'node type 1' (NT1) 181, 'node type 3' (NT3) 183, and 'node type 4' (NT4) 184, and the 'site 3' 153 comprises only 'node type 2' (NT2) 182, 'node type 3' (NT3) 183, and 'node type 4' (NT4) 184.

FIG. 23 shows an exemplary table for the category of clustered sites 162 and an exemplary table for node type and information 163 for the exemplary extrapolation process in the DBP based on the clustering of the sites. The DBP can keep a table for the category of clustered sites 162, which comprises information for the site clusters and their associated node types. Once the categorization is processed, the DBP can produce a table for the list of node types and their associated information in the exemplary table for node type and information 163. The table comprises the attribute information for the node cluster category, site, and location of all the available nodes for each node type. In the exemplary embodiment shown in FIG. 23, the 'node type 1' (NT1) 181 in the node type column comprises two sets of attributes, [CAT1, SITE1, LOC1] and [CAT1, SITE2, LOC1], which designate the 'node type 1' (NT1) 181 in the 'site 1' 151 and 'site 2' 152. The 'node type 1' (NT1) 181 cannot be found in any other sites in the media network according to the exemplary embodiment. Similarly, the other node types in the node type column comprise their relevant sets of attributes, which designate the corresponding node types in the relevant sites.

Based on the exemplary table for node type and information 163, the DBP can select sample nodes per each node type and extrapolate the result to all the other nodes within the same node type category. For simplicity, the number of attribute sets per node type in the exemplary table for node type and information 163 shown in FIG. 23 is very minimal. However, in real-world application the number of attribute sets per node type is usually large. The percentage value of the sampling for the sample nodes per each node type can be predefined by the decision maker of the media network 160.

FIG. 24 and FIG. 25 show an exemplary forecasting method in the DBP for the customers' demographics for the following week, month and year based on historical data from the site and also other similar sites in the media network 160. The DBP uses a time series analysis to generate trends in historical data and sites within the media network 160. From these trends, the DBP forecasts the data for each site. From the data for the sites, the DBP generates a forecast for the regions and enterprise levels in the exemplary embodiment.

FIG. 24 shows demographic composition measurement 450, month of the year patterns 265, week of the month patterns 266, day of the week patterns 267, and hour of the day patterns 268 in the forecasting process in an exemplary embodiment of the DBP. FIG. 25 shows an exemplary forecasting process in the exemplary embodiment of the DBP. After the DBP measures the customers' demographics for a period of time, it can produce the demographic composition data for each demographic category as shown in the graph of the demographic composition measurement 450 in FIG. 24. For each demographic category, the DBP can measure the growth rate pattern depending on the various levels of detail, such as the month of the year patterns 265, week of the month patterns 266, day of the week patterns 267, and hour of the day patterns 268 as shown in FIG. 24. The DBP can utilize these data in order to forecast the customer demographics for the targeted window of time. For example, the DBP can use the historic measurement data 271 and the measurement data until time tO 272, in order to forecast the customer demographics for a predefined targeted window of time, based on the growth rate in the month of the year patterns 265, as shown for the forecasting based on growth rate 273, in the exemplary embodiment in FIG. 25.

FIG. 26 shows exemplary factors that influence the accuracy of the forecast in an exemplary embodiment of the DBP. One way to isolate all the factors is through the use of exhaustive data, as shown in the required data column of the 'first table for the factors influencing forecasts' 164 and 'second table for the factors influencing forecasts' 165. In the absence of sufficient data to capture those factors, expert input can be entered into the system to influence the forecasts, as shown in the tables of FIG. 26. By a mix of historical data and expert input the system can start forecasting right away. The weight of historical data vs. expert input keeps increasing as more historical data becomes available.

Furthermore, any trends that cannot be detected from the data, such as the economic growth in a region, or a new site, etc. can be taken into account by expert input. In the exemplary embodiment, the process that the DBP uses for forecasting can be an expert in the loop forecast method. In this exemplary method, the DBP first analyzes the historical data to prepare it for forecasting by detecting potential abnormalities. Then an expert classifies them into abnormalities or valid trends. Then, the DBP forecasts the data for the required period. The system keeps evaluating the performance of the forecasts and makes adjustments to the forecasts.

In the exemplary embodiment, the preparation of the data for forecasting comprises both the analysis of the data for trends and abnormalities and the expert classification for the events into abnormality or trend. The forecasts in the DBP are based on the available trend and abnormality information after the data preparation, and the forecasts can be further adjusted by any new data that is added and accounted for, such as a weather change in a local area or past data.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for forecasting demographic characterization of customers on each means for playing output of each site of a plurality of sites in a media network through automatically measuring, characterizing, and estimating demographic information of customers that appear in the vicinity of each means for playing output, comprising the following steps of:
    a) capturing a plurality of input images of the customers in the vicinity of each measured means for playing output over a period of time by means for capturing images,
    b) processing the plurality of input images in order to measure the demographic information of the customers using a computer vision based demographic segmentation technology in a computer as an analysis of the customers,
    c) transferring the demographic information measurement data from each computer to a central server,
    d) extrapolating the measurement of the demographic information in order to characterize the demographic information for each means for playing output of each site,
    e) forecasting the demographic characterization of customers individually for each means for playing output of each site,
    f) querying the demographic characterization and the forecasting of demographic characterization and representing the demographic information measurement from the plurality of sites in the media network using a data representation means, and
    g) customizing programming contents of each means for playing output in the media network, wherein the extrapolation, the characterization, and the forecasting of demographic characterization for said each means for playing output are processed in the central server, whereby said demographic characterization is used to help customize programming contents in said media network, and
    whereby the demographic information comprises age, gender, and ethnicity information.

2. The method according to claim 1, wherein the method further comprises a step of sampling a predefined number of means for playing output in said media network,
    wherein the measurement of demographic information of said customers is performed for the sample means for playing output, and the sample measurement is extrapolated to other means for playing output.

3. The method according to claim 1, wherein the method further comprises a step of measuring the demographic information through the Support Vector Machine (SVM) based image classifier,
    wherein the SVM is utilized as a comprehensive solution that captures video frames, detects customer faces in the frames, tracks the faces individually, corrects the pose of the faces, and classifies the demographics profiles of the customers, including gender and ethnicity.

4. The method according to claim 1, wherein the method further comprises a step of reporting the characterization and forecasting results to a decision maker in said each site or in said media network through queries,
    whereby the step helps said decision maker to better understand said customers in the vicinity of said means for playing output.

5. The method according to claim 1, wherein the method further comprises a step of utilizing the historical data and additional input information for forecasting said programming contents.

6. The method according to claim 1, wherein the method further comprises steps of detecting the customers' faces in said plurality of input images, individually tracking the detected faces by keeping their assigned identities, and measuring the demographic composition of the audience,
    wherein the demographic composition measurement is used for forecasting the demographic characterization of customers.

7. The method according to claim 1, wherein the method further comprises a step of detecting the locations of the facial features on detected faces in said plurality of input images, and thereby estimating the position, size, and orientation of said detected faces,
    wherein the position, size, and orientation are used to correct the face image so that the facial features are placed on predefined locations.

8. The method according to claim 7, wherein the method further comprises a step of building an appearance model of a customer across image frames containing the same customer's face, aligned using the estimates from the step of estimating the position, size, and orientation of said detected faces.

9. The method according to claim 1, wherein the method further comprises a step of segmenting out the regions having skin-like color pixel values in said plurality of input images.

10. The method according to claim 1, wherein the method further comprises a step of managing face tracks to find a correct match between the face tracks history and a new input face, using geometric match score and appearance match score, wherein the geometric match score is based on the difference in the position, size, and the time between the new face and the last face in the track, and
    wherein the appearance match score measures a difference between the model face appearance stored in the track and the new face.

11. The method according to claim 1, wherein the method further comprises a step of automatically classifying the gender of a customer based on the accumulated evidence from the gender scores of all the faces in the customer track.

12. The method according to claim 1, wherein the method further comprises a step of automatically classifying the ethnicity of a customer among multiple designated classes of ethnicity based on the accumulated evidence from the ethnicity scores of all the faces in the customer track,
   wherein the ethnicity scores are calculated using the same number of learning machines as the number of ethnic groups, and
   wherein each learning machine is tuned to a given ethnic group.

13. The method according to claim 1, wherein the method further comprises a step of extrapolating the customers' demographic measurement from sampled nodes to all the other nodes within the same node type category based on the node types and the clustering of sites based on POS data and store layout,
   wherein attribute information for the node types comprises node cluster category, site, and location of the node in the site.

14. The method according to claim 1, wherein the method further comprises a step of forecasting the customers' demographics based on growth rate patterns in various levels of detail and a historical measurement of the customers' demographics, whereby the growth rate patterns comprise month of the year patterns, week of the month patterns, day of the week patterns, and hour of the day patterns.

15. An apparatus for forecasting demographic characterization of customers on each means for playing output of each site of a plurality of sites in a media network through automatically measuring, characterizing, and estimating demographic information of customers that appear in the vicinity of each means for playing output, comprising:
   a) means for capturing images that captures a plurality of input images of the customers in the vicinity of each measured means for playing output over a period of time,
   b) a computer for processing the plurality of input images in order to measure the demographic information of the customers as an analysis of the customers,
   c) a central server that performs the following steps of:
   extrapolating the measurement of the demographic information in order to characterize the demographic information for each means for playing output of each site,
   forecasting the demographic characterization of customers individually for each means for playing output of each site,
   querying the demographic characterization and the forecasting of demographic characterization and representing the demographic information measurement from the plurality of sites in the media network using a data representation means, and
   customizing programming contents of each means for playing output in the media network,
   wherein the demographic information measurement data is transferred from each computer to the central server,
   whereby said demographic characterization is used to help customize programming contents in said media network, and
   whereby the demographic information comprises age, gender, and ethnicity information.

16. The apparatus according to claim 15, wherein the apparatus further comprises a computer for sampling a predefined number of means for playing output in said media network,
   wherein the measurement of demographic information of said customers is performed for the sample means for playing output, and the sample measurement is extrapolated to other means for playing output.

17. The apparatus according to claim 15, wherein the apparatus further comprises a computer for measuring the demographic information through the Support Vector Machine (SVM) based image classifier,
   wherein the SVM is utilized as a comprehensive solution that captures video frames, detects customer faces in the frames, tracks the faces individually, corrects the pose of the faces, and classifies the demographics profiles of the customers, including gender and ethnicity.

18. The apparatus according to claim 15, wherein the apparatus further comprises a computer for reporting the characterization and forecasting results to a decision maker in said each site or in said media network through queries,
   whereby the measurement and estimation information help said decision maker to better understand said customers in the vicinity of said means for playing output.

19. The apparatus according to claim 15, wherein the apparatus further comprises a computer for utilizing the historical data and additional input information for forecasting said programming contents.

20. The apparatus according to claim 15, wherein the apparatus further comprises a computer for detecting the customers' faces in said plurality of input images, individually tracking the detected faces by keeping their assigned identities, and measuring the demographic composition of the audience,
   wherein the demographic composition measurement is used for forecasting the demographic characterization of customers.

21. The apparatus according to claim 15, wherein the apparatus further comprises a computer for detecting the locations of the facial features on detected faces in said plurality of input images, and thereby estimating the position, size, and orientation of said detected faces,
   wherein the position, size, and orientation are used to correct the face image so that the facial features are placed on predefined locations.

22. The apparatus according to claim 21, wherein the apparatus further comprises a computer for building an appearance model of a customer across image frames containing the same customer's face, aligned using the estimates from the step of estimating the position, size, and orientation of said detected faces.

23. The apparatus according to claim 15, wherein the apparatus further comprises means for segmenting out the regions having skin-like color pixel values in said plurality of input images.

24. The apparatus according to claim 15, wherein the apparatus further comprises a computer for managing face tracks to find a correct match between the face tracks history and a new input face, using geometric match score and appearance match score,
   wherein the geometric match score can be based on the difference in the position, size, and the time between the new face and the last face in the track, and
   wherein the appearance match score measures the difference between the model face appearance stored in the track and the new face.

25. The apparatus according to claim 15, wherein the apparatus further comprises a computer for automatically classifying the gender of a customer based on the accumulated evidence from the gender scores of all the faces in the customer track.

26. The apparatus according to claim 15, wherein the apparatus further comprises a computer for automatically classifying the ethnicity of a customer among multiple designated classes of ethnicity based on the accumulated evidence from the ethnicity scores of all the faces in the customer track, wherein the ethnicity scores are calculated using the same number of learning machines as the number of ethnic groups, and wherein each learning machine is tuned to a given ethnic group.

27. The apparatus according to claim 15, wherein the apparatus further comprises a computer for extrapolating the customers' demographic measurement from sampled nodes to all the other nodes within the same node type category based on the node types and the clustering of sites based on POS data and store layout, wherein attribute information for the node types comprises node cluster category, site, and location of the node in the site.

28. The apparatus according to claim 15, wherein the apparatus further comprises a computer for forecasting the customers' demographics based on growth rate patterns in various levels of detail and a historical measurement of the customers' demographics, whereby the growth rate patterns comprise month of the year patterns, week of the month patterns, day of the week patterns, and hour of the day patterns.

* * * * *